US007305188B2

(12) United States Patent
Yamashita et al.

(10) Patent No.: US 7,305,188 B2
(45) Date of Patent: Dec. 4, 2007

(54) WAVELENGTH DEMULTIPLEXING UNIT

(75) Inventors: Shinji Yamashita, Kawasaki (JP);
Tsuyoshi Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 548 days.

(21) Appl. No.: 10/893,435

(22) Filed: Jul. 19, 2004

(65) Prior Publication Data
US 2005/0213978 A1 Sep. 29, 2005

(30) Foreign Application Priority Data
Mar. 29, 2004 (JP) .............................. 2004-097099

(51) Int. Cl.
*H04J 14/02* (2006.01)
(52) U.S. Cl. .......................................... 398/79; 398/82
(58) Field of Classification Search .................. 398/79, 398/43, 45, 68, 82; 385/11, 16, 24, 37; 359/223
See application file for complete search history.

(56) References Cited

U.S. PATENT DOCUMENTS

| 5,414,540 | A | * | 5/1995 | Patel et al. | .................. 349/196 |
| 6,097,518 | A | * | 8/2000 | Wu et al. | ....................... 398/1 |
| 6,535,311 | B1 | * | 3/2003 | Lindquist | ..................... 398/82 |
| 6,549,699 | B2 | | 4/2003 | Belser et al. | .................. 385/24 |
| 6,901,175 | B2 | * | 5/2005 | Baxter et al. | .................. 385/11 |
| 2003/0072512 | A1 | * | 4/2003 | Nagaeda et al. | .............. 385/11 |
| 2003/0091261 | A1 | * | 5/2003 | Wu et al. | ....................... 385/11 |
| 2003/0223670 | A1 | * | 12/2003 | Nikolov et al. | ............... 385/11 |
| 2005/0036202 | A1 | * | 2/2005 | Cohen et al. | ................ 359/495 |

FOREIGN PATENT DOCUMENTS

JP 2002-236264 8/2002

OTHER PUBLICATIONS

K. Sato et al. "Envisaged IP Over Photonic Networks of The Year 2010(2) Cutting-Edge Technologies On Photonic Backbone Networks", Electronic Information Society Magazine, vol. 85, No. 2, pp. 94-103, Feb. 2002.

M. Shirasaki, "Large Angular Dispersion By A Virtually Imaged Phased Array and Its Application to a Wavelength Demultiplexer", 1996 Optical Society of America, Optics Letters, vol. 21, No. 5, pp. 366-368, Mar. 1, 1996.

* cited by examiner

*Primary Examiner*—Jason Chan
*Assistant Examiner*—Quan-Zhen Wang
(74) *Attorney, Agent, or Firm*—Staas & Halsey LLP

(57) ABSTRACT

In a WDM transmission system, a wavelength selecting switch demultiplexes a first WDM light containing a plurality of wavelength components into a plurality of single wavelength lights each containing corresponding one of the wavelength components, effects multiplexing on the plurality of single wavelength lights to form a second WDM light, and effects demultiplexing on the outputted second WDM light. A wavelength demultiplexing unit demultiplexes the demultiplexed second WDM light into a plurality of wavelength demultiplexed lights for every wavelength component so that physical quantity monitoring can be made on each wavelength demultiplexed light deriving from the demultiplexing. In this way, transmission channel switching can be independently effected on the wavelength light having a single component contained in the WDM light, wavelength demultiplexing elements provided in a spectral optical system can be shared to reduce the number of elements, and the wavelength selection switch can be assembled with ease.

11 Claims, 14 Drawing Sheets

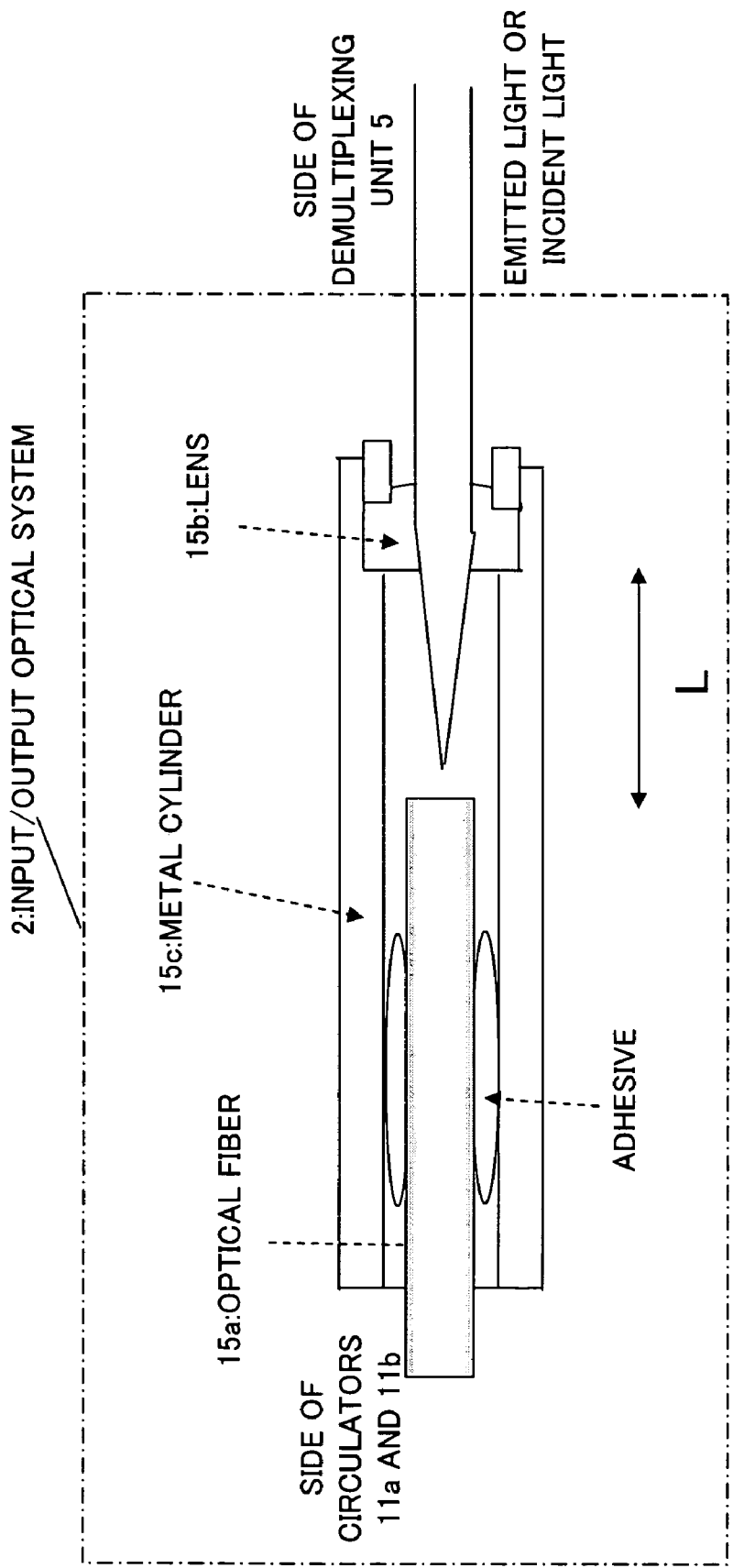

ATTACH LENS ARRAY ON FIBER BLOCK FRONT FACE

TO ADHERE UPPER AND LOWER SUBSTRATES TO EACH OTHER TO FIX FIBER CORES. AFTER FIXING, POLISH FRONT FACE OF BLOCK SO THAT FIBER EMISSION ANGLE BECOMES NORMAL TO FIBER BLOCK FRONT FACE

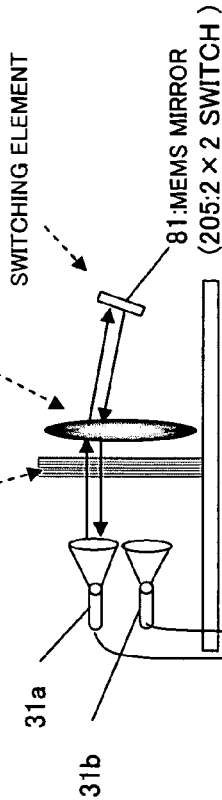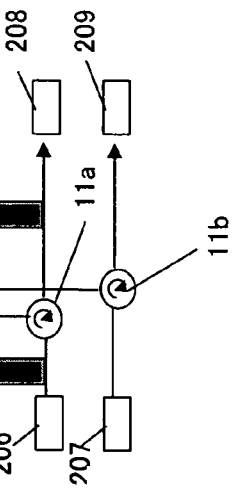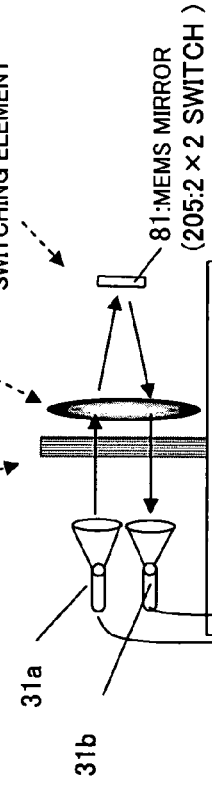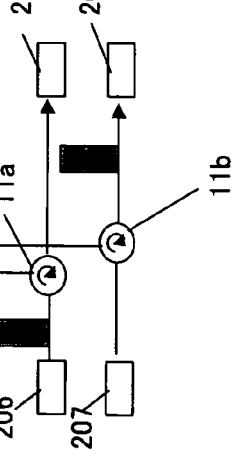
FIG. 4(a) ESTABLISH CONNECTION FROM INPUT PORT 206 TO OUTPUT PORT 209
FIG. 4(b) ESTABLISH CONNECTION FROM INPUT PORT 206 TO OUTPUT PORT 208

WHEN RETURN TO ORIGINAL PORT

WHEN RETURN TO ADJACENT PORT

9a: OPTICAL POWER DETECTING UNIT

WAVELENGTH DEMULTIPLEXING UNIT

BACKGROUND OF THE INVENTION (1) Field of the Invention

The present invention relates to a wavelength demultiplexing unit suitable for use in an optical system for switching a transmission channel for each wavelength component (hereinafter referred to as a wavelength selection switch) employed in, for example, a WDM (Wavelength Division Multiplexing) transmission system.

(2) Description of Related Art

Recently, in order to handle traffic data quantity dramatically increasing in the Internet, rapid development can be observed in an optical-technology oriented network which seeks an optical arrangement (i.e., optical communication or optical interface) having a wavelength division multiplexing communication as a core technology. The current network topology (network of a WDM transmission system) is, for example, a point-to-point type in which a couple of terminal nodes (transmission node apparatus) are directly connected to each other. However, prediction about network development is made such that a network topology in the near future will become a ring-type or a mesh type (see Non-Patent Document 1).

Further, each of the nodes constituting the network is expected to carry out switching directly on the optical signals concerning the Add and Drop processing for demultiplexing and inserting a signal light having a desired wavelength without doing OE conversion (Optical to Electrical conversion) between an optical signal and electrical packet (electrical-signal), EO conversion (Electrical to Optical conversion) and the like. With this operation, each node can perform processing such as optical signal channel switching or the like at a high speed. As a consequence, channel setting and channel change can be performed dynamically.

The above-described optical switch can change independently a transmission channel of a single wavelength light contained in the wavelength division multiplexing light inputted into the optical switch, and n-single wavelength lights having the transmission channel changed are again subjected to the wavelength division multiplexing depending on necessity. That is, the optical switch selects one or a plural number of single wavelength lights from the n-single wavelength lights, synthesizes the selected one or a plural number of single wavelength lights to form a wavelength division multiplexing signal light, and outputs the wavelength division multiplexing signal light.

Meanwhile, wavelengths of respective single wavelength lights are based on a specification known as ITU grid which is standardized by ITU (International Telecommunication Union). Therefore, the number of wavelength division multiplexing employed in the photonic network system is determined based on the regulation.

(X1) Network Arrangement

Next, description will be made on a case in which the wavelength selection switch is provided in a mesh type network.

FIG. 11 is a diagram for explaining a wavelength selection switch provided in a mesh type network system. As shown in FIG. 11, a network 100 is a mesh type one. Further, in FIG. 11, reference numerals 201 to 204 represent wavelength selection switches, 205 a multiplexer, 206 and 207 input ports of the wavelength selection switch 203, and 208 and 209 output ports.

The wavelength selection switch 203 will be described as one for carrying out switching among eight single wavelength lights (light rays) in an optical, manner, for example. A wavelength division multiplexed signal light (W1) transmitted from the wavelength selection switch 201 and a wavelength division multiplexed signal light (W2) transmitted from the multiplexer 205 are supplied to the wavelength selection switch 203 at the input ports 206 and 207, respectively. The wavelength selection switch 203 carries out switching operation independently on transmission channels for the eight single wavelength lights in total, i.e., four single wavelength lights contained in the wavelength division multiplexed signal light (W1) and four single wavelength lights contained in the wavelength division multiplexed signal light (W2). Thus, the eight single wavelength lights having a transmission channel changed by the switching operation are subjected to wavelength division multiplexing to form wavelength division multiplexed signal lights (W3, W4). Each of the created wavelength division multiplexed signal lights (W3, W4) are outputted from the output ports 208 and 209, respectively.

(X2) Wavelength Selection Switch

FIG. 12 is a diagram for illustrating a case in which a 2×2 switch (2×2 SW) is employed as a wavelength selection switch 203. As shown in FIG. 12, reference numerals 204a and 204b represent demultiplexing units, 205 a 2×2 switch, 204c and 204d multiplexing units, respectively. As the 2×2 switch, MEMS (Micro Electro Mechanical Systems) can be employed, and a reflection type diffraction grating can be employed as a device serving as the wavelength demultiplexing unit and the wavelength multiplexing unit.

Operation of the wavelength selection switch 203 will be described.

A wavelength division multiplexed signal light W1 (containing signal lights of single wavelengths, $\lambda 2, \lambda 5, \lambda 6$) and a wavelength division multiplexed signal light W2 (containing signal lights of single wavelengths, $\lambda 1, \lambda 3, \lambda 4, \lambda 7$) are subjected to demultiplexing operation in the demultiplexing units 204a and 204b, respectively. The demultiplexed lights are inputted into the 2×2 switches 205 provided for the single wavelength lights, respectively. The 2×2 switches 205 determines which of the inputted single wavelength signal lights shall be outputted from which of the output units. A single wavelength light outputted from a first output port (an upper side output port in FIG. 12) of the 2×2 switch 205 is inputted into the wavelength synthesizer 204c and a single wavelength light outputted from a second output port (an lower side output port in FIG. 12) of the 2×2 switch 205 is inputted into the wave synthesizer 204d. If the 2×2 switch 205 has an attenuation function, the degree of attenuation may be adjusted upon the selection so that the respective single wavelength lights come to have substantially the same power when the lights are applied to the wave synthesizing units 204c and 204d. In this way, it becomes possible to control each of the wavelength signal lights to have a substantially uniform level of power by a single amplifier (not shown) after the signal lights are synthesized in the wave synthesizers 204c and 204d.

The wavelength division signal lights (W3 and W4) deriving from the wavelength synthesis in the wavelength synthesizers 204c and 204d are outputted from the output ports 208 and 209.

(X3) Wavelength Selection Switch having Monitoring Function

What set forth above is an explanation of the main function of the wavelength selection switch 203. Now description will be more fully made on control of the 2×2 switch 205 in relation with the monitoring of the signal lights having undergone the wavelength selection.

FIG. 13 is a diagram illustrating an arrangement of a conventional wavelength selection switch having a monitoring function.

In FIG. 13, reference numerals 210a and 210b represent circulators, 211a and 211b optical couplers for demultiplexing an optical signal, 212a and 212b spectrum monitors for observing spectrum of the inputted lights, 213 a control circuit for controlling an angle of a mirror of the 2×2 switch (e.g., MEMS), 214a to 214d driving circuits (drivers) for outputting driving voltages for controlling the angle of MEMS mirrors corresponding to respective wavelengths (in this case, four wavelengths), 215 a collimator lens, 216 a demultiplexing section for implementing the functions of the demultiplexing units 204a and 204b (FIG. 12) and the wave synthesizers 204c and 204d, 217 an input/output optical system, 218a and 218b a first output unit and a second input/output unit, respectively.

Operation of the above arrangement will be briefly described.

As will be described above, the wavelength division multiplexed signal lights (W1, W2) are inputted to the input ports 206 and 207 owing to optical fiber connection. Each of the wavelength division multiplexed signal lights (W1, W2) is supplied to the first input/output unit 201a and the second input output unit 218b through the circulators 210a and 210b. The inputted optical signals are converted into collimated lights by the input/output optical system 217. That is, the input/output optical system 217 has collimators provided at the tip end of respective optical fibers so that inputted lights can be collimated.

The WDM signals (W1 and W2) shaped into collimated lights are irradiated onto different spots (spots shifted from each other in Z-direction) on the diffraction grating as the demultiplexing section.

Lights having respective wavelengths deriving from the demultiplexing are collimated by the collimator lens 215 and incident on respective MEMS mirrors constituting the 2×2 switch 205. In this case, illustration is made for easy understanding in such a manner that four MEMS mirrors are provided and the wavelength division multiplexed signals W1 and W2 share no common signal component having the same wavelength.

The single wavelength lights irradiated onto the 2×2 switch 205 (MEMS) is reflected on the corresponding MEMS mirrors and again irradiated onto the demultiplexing section 216 through the collimator lens 215.

Now, description will be made on a case in which the single wavelength light ($\lambda 1$) contained in the wavelength division multiplexed signal (W1) inputted at the input port 206 is outputted at the output port 209, with reference to FIG. 4(a). As shown in FIG. 4(a), the wavelength division multiplexed signal (W1) inputted at the input port 206 is fed to a first input/output unit 31a through a circulator 11a, and subjected to the demultiplexing in the demultiplexing section 5. The single wavelength light having the wavelength of $\lambda 1$ is irradiated onto the 2×2 switch 205 (an MEMS mirror 81 for the single wavelength light having the wavelength of $\lambda 1$) through the collimator lens 6.

The single wavelength component of $\lambda 1$ is reflected upon the MEMS mirror 81 which is controlled in its angle in accordance with a control voltage outputted from the driving circuit 214a to 214d (FIG. 13) operated based on the control of the control circuit 213. The single wavelength component of $\lambda 1$ is irradiated onto the demultiplexing section 5 (FIG. 4(a)) through the collimator lens 6. At this time, the single wavelength component of $\lambda 1$ is led to the demultiplexing section 5 to form a spot thereon which corresponds to a position leading the component to the second input/output unit 31b owing to the reflection on the demultiplexing section 5. Therefore, the MEMS mirror 81 is controlled in its angle so that the light is returned to the optical fiber connected to the second input/output unit 31b.

Meanwhile, description will be made on a case in which the single wavelength light ($\lambda 1$) contained in the wavelength division multiplexed signal (W1) inputted at the input port 206 is outputted at the output port 208, with reference to FIG. 4(b).

As shown in FIG. 4(b), the wavelength division multiplexed signal (W1) inputted at the input port 206 is fed to a first input/output unit 31a through a circulator 11a, and subjected to the demultiplexing in the demultiplexing section 5. The single wavelength light having the wavelength ($\lambda 1$) is irradiated onto the 2×2 switch 205 (an MEMS mirror 81 for the single wavelength light having the wavelength of $\lambda 1$) through the collimator lens 6.

The single wavelength component ($\lambda 1$) is reflected upon the MEMS mirror 81 which is controlled in its angle in accordance with the control voltage (or voltages) outputted from the driving circuit 214a to 214d (see FIG. 13) operated based on the control of the control circuit 213. The single wavelength component is irradiated through the collimator lens 6 (FIG. 4(a)) onto the demultiplexing section 5 at the spot which is substantially the same as that to which the single wavelength component is first incident thereon. That is, single wavelength component is led to the spot which corresponds to a position leading the component to the first input/output unit 31a. Therefore, the MEMS mirror 81 is controlled in its angle so that the light is returned to the same optical fiber connected to the first input/output unit 31a.

As described above, the optical signal reflected on the 2×2 switch 205 is outputted from one of the first input/output unit 31a and the second input/output unit 31b depending on the reflection angle, and led to the output port 208 or the 209 through the circulator 11a or 11b.

As described above, transmission channels can be changed for each of the optical signals having respective wavelengths in a desired manner in accordance with the angle control of the 2×2 switch 205. However, the angle control is so delicate that it is requested to monitor whether proper angle setting is achieved or not for optimizing the state of control.

(X4) Control on 2×2 Switch by Monitor

One of prior arts handles the above-described problems in a manner as follows. That is, as shown in FIG. 13, the spectrum monitors 212a and 212b are provided for performing monitoring on the optical signals having undergone the wavelength selection by demultiplexing with the couplers 211a and 211b. That is, the signal lights of respective wavelengths are measured in their power and the result thereof is supplied to the control circuit 213.

The control circuit 213 controls the driving circuits 214a to 214d corresponding to the MEMS mirrors assigned to respective wavelengths based on the results of measurement on respective wavelengths so that the driving voltage is (or voltages are) adjusted and so-called feedback control is effected so that the MEMS mirrors are set to have optimized angles.

When the optimized angle is determined for the MEMS mirrors, the manner of determining the angle seeks not only one making it possible to minimize the coupling loss thereof but also so-called VOA (Variable Optical Attenuator) function realization for variably determining the amount of attenuation in the optical power of the single wavelength light. In other words, the angle of the MEMS mirror may be deviated from an angle making the coupling loss to be minimized, or the angle is intentionally set to an angle making the loss of the single wavelength light be increased.

While several examples of the prior art have been described above, plenty of technologies relating to the wavelength selection have been proposed. In particular, Patent Document 1, for example, discloses a WSR (Wavelength-Separating-Routing) apparatus having a monitoring function which performs wavelength division demultiplexing on a signal by using a diffraction grating. Non-Patent Document 2 discloses an apparatus employing a VIPA (Virtually Imaged Phase Array) as a wavelength demultiplexing element. Further, Non-Patent Document 3 discloses an apparatus using a demultiplexing unit which is fabricated by using a photonic crystallization technology.

Patent Document 1: U.S. Pat. No. 6,549,699

Non-Patent Document 1: Monthly Bulletin of Institute of Electronics, Information and Communication Engineers, February 2002, pp. 94-103.

Non-Patent Document 2: M. Shirasaki "Large angular dispersion by a virtually imaged phased array and its application to a wavelength demultiplexer", OSA Optics Letters, Vol. 21, No. 5, pp. 366-368

Non-Patent Document 3: Monthly Bulletin of "Optronics" (published by The Optronics Co., Ltd.) July 2001, pp. 179-208.

However, according to the prior art technology, it is necessary to provide a spectrum monitor separately from the wavelength selection switch for feedback control. For this reason, the prior art technology encounters difficulty in small-sizing the wavelength selection switch.

SUMMARY OF THE INVENTION

The present invention is made in view of the above aspect. Therefore, it is an object of the present invention to provide a wavelength selection switch capable of applying to a unit for performing deflection control independently for respective wavelength signal lights after demultiplexing operation. With this invention, components constituting the wavelength selection switch can be effectively utilized or the wavelength selection switch including a monitor unit can be small-sized.

The object of the present invention is not limited to the above-described one, but further objects of the present invention can also be found in effects or advantages which are led by embodiments and modification thereof, described later on, as the best mode of the present invention, and which will not be obtained by the prior art.

(1) According to the present invention, there is provided a wavelength division multiplexed (WDM) light demultiplexing unit including demultiplexing means for demultiplexing a first WDM light irradiated at a first spatial position into a plurality of signal lights, deflection control means for independently controlling each deflection direction of the plurality of signal lights demultiplexed in the demultiplexing means, irradiating means for irradiating a second WDM light, which is obtained by multiplexing of a plurality of deflection-controlled signal lights, onto a second spatial position of the demultiplexing means, and reflecting means for reflecting the deflection information concerning the deflection direction obtained by monitoring a plurality of other signal lights, which is irradiated at another position and demultiplexed, back to a control of the deflection control means.

(2) According to the present invention, there is provided a WDM light demultiplexing unit based on the WDM light demultiplexing unit of the above-paragraph (1), wherein the demultiplexing means is essentially composed of a device of diffraction grating or a device of VIPA.

(3) According to the present invention, there is provided a WDM light demultiplexing unit based on the WDM light demultiplexing unit of the above-paragraph (1), wherein the deflection control in the deflection control means is carried out by MEMS mirror tilting control.

(4) According to the present invention, there is provided a WDM light demultiplexing unit based on the WDM light demultiplexing unit of the above-paragraph (1), wherein the second spatial position is a predetermined position, the reflecting means comprises a plurality of optical power detecting units for detecting an optical power, the optical power detecting units being disposed at predetermined positions at which the optical power detecting units becomes capable of receiving the signal lights, respectively, and the signal lights are to be demultiplexed by an irradiation of the signal light when the signal light is multiplexed at the predetermined spatial position.

(5) According to the present invention, there is provided a WDM light demultiplexing unit including first demultiplexing means for demultiplexing a first WDM light, deflection control means for independently controlling each deflection direction of a plurality of signal lights demultiplexed in the first demultiplexing means, monitoring means for giving a second WDM light, which is obtained by multiplexing of a plurality of deflection-controlled signal lights, onto the first demultiplexing means or a second demultiplexing means, placed at a vicinity of the first demultiplexing means, for demultiplexing a second WDM light spatial position of the demultiplexing means into a plurality of demultiplexed second WDM lights, and monitoring the plurality of demultiplexed second WDM lights, and reflecting means for reflecting a monitoring result of the monitoring means back to a control of the deflection control means.

(6) According to the present invention, there is provided a WDM light demultiplexing unit including an input/output optical system essentially composed of common members for a transmission light and a monitoring light, demultiplexing means for demultiplexing a WDM light coming from the input/output system and outputting a plurality of signal lights, deflection control means for independently controlling each deflection direction of the plurality of signal lights demultiplexed in the demultiplexing means, monitoring means for monitoring the plurality of signal lights demultiplexed in the demultiplexing means, and reflecting means for reflecting a monitoring result of the monitoring means back to a control of the deflection control means.

(7) According to the present invention, there is provided a WDM light demultiplexing unit including an input/output optical system for introducing a transmission light and a monitoring light into the unit, demultiplexing means for demultiplexing a WDM light coming from the input/output system and outputting a plurality of signal lights, deflection control means for independently controlling each deflection direction of the plurality of signal lights demultiplexed in the demultiplexing means, monitoring means, disposed on a member commonly constituting the deflection control means, for monitoring the plurality of signal lights demultiplexed in the demultiplexing means, and reflecting means for reflecting a monitoring result of the monitoring means back to a control of the deflection control means.

According to the present invention, in a unit for performing polarization control independently for each of wavelength signal lights having undergone the demultiplexing operation, components constituting the wavelength selection switch can be effectively utilized. Furthermore, the wavelength selection switch including a monitor unit can be small-sized.

BRIEF DESCRIPTION OF THE DRAWINGS

FIG. 2 is a diagram showing an inner arrangement of an input/output optical system according to the first embodiment of the present invention;

FIGS. 4(a) and 4(b) are diagrams for explaining how a wavelength division multiplexed light is incident on a switching element and a reflected light therefrom is led from the switching element;

DESCRIPTION OF THE PREFERRED EMBODIMENTS

Several embodiments of the present invention will be hereinafter described with reference to the attached drawings.

(A) Explanation of First Embodiment (1) Network arrangement

Figure 13:
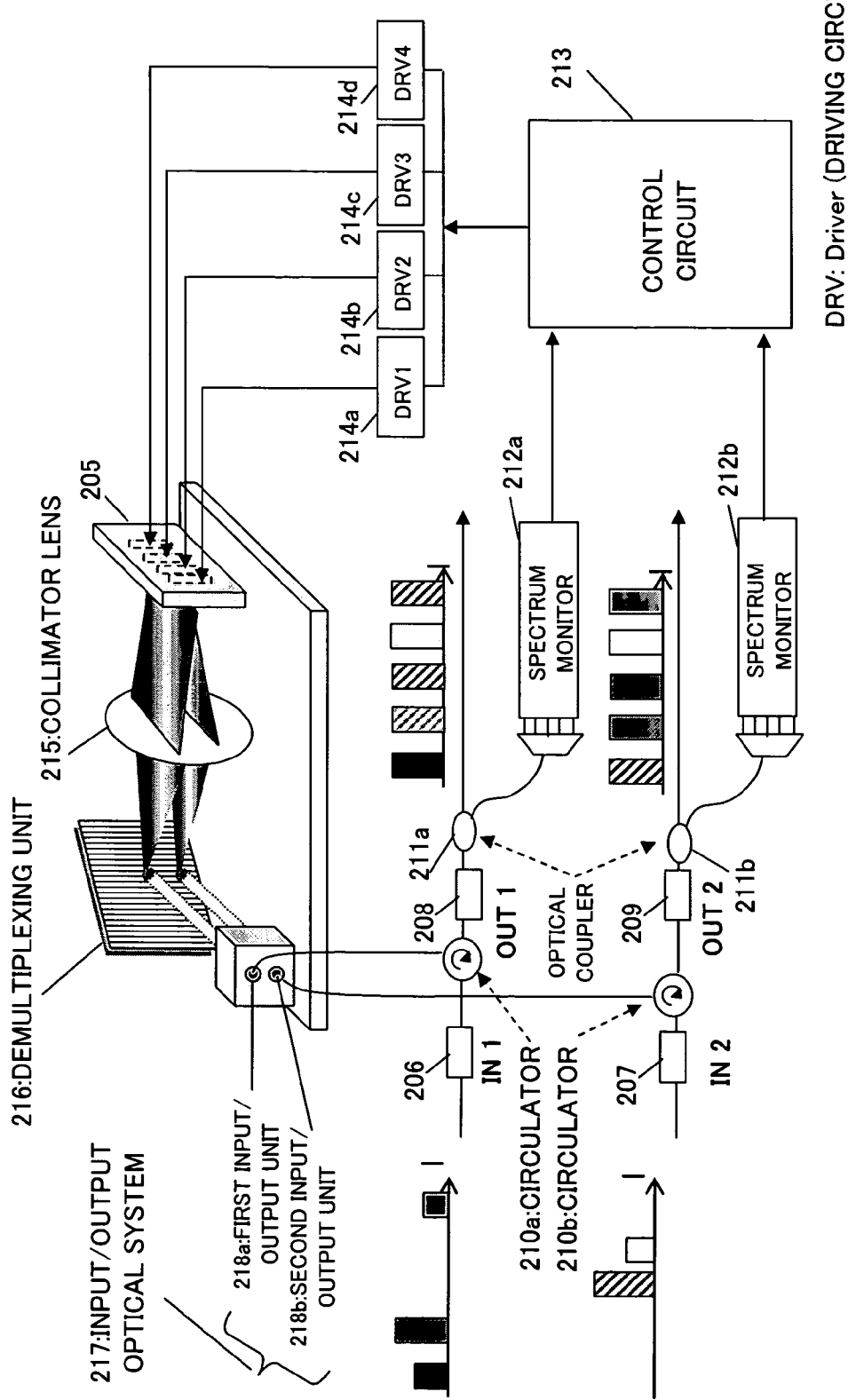
FIG. 13 is a diagram showing a wavelength selection switch equipped with a conventional monitoring function.

A network arrangement of a first embodiment of the present invention is similar to that described with reference to FIG. 13. Therefore, it will not be described.

(2) Wavelength Selection Switch Equipped with Monitoring Function

Description will be made on a wavelength selection switch according to first embodiment of the present invention which can be applied as the wavelength selection switches 201 to 204 described with reference to FIG. 13.

Figure 1:
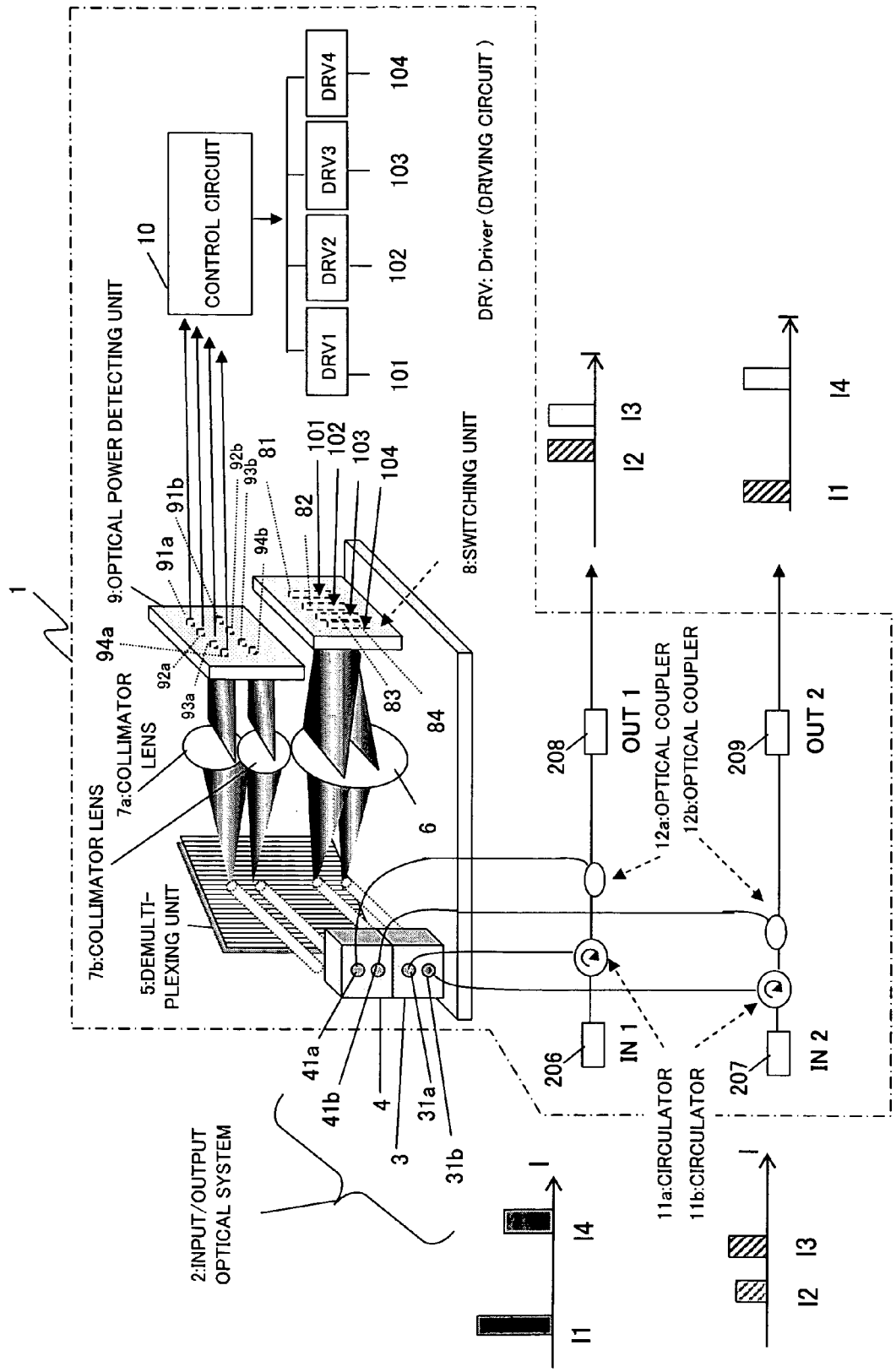
FIG. 1 is a diagram showing an arrangement of a wavelength selection switch equipped with a monitoring function according to the a first embodiment of the present invention.

FIG. 1 is a diagram showing an arrangement of a wavelength selection switch equipped with monitoring function according to the first embodiment of the present invention.

In FIG. 1, reference numeral 1 depicts a wavelength selection switch (wavelength demultiplexing unit) equipped with monitoring function, and 2 an input/output optical system. The input/output optical system 2 includes a transmission light input/output unit 3 serving as an input/output interface for a wavelength division multiplexed signal which is a target of wavelength selection. The input/output optical system 2 also includes a monitoring light input/output unit 4 for the monitoring on a wavelength division multiplexed signal having undergone the wavelength selection operation. The transmission light input/output unit 3 has a first input/output unit 31a and a second input/output unit 31b while the monitoring light input/output unit 4 has a first input/output unit 31a and a second input/output unit 31b. Reference numeral 5 represents a demultiplexing unit for demultiplexing an optical signal outputted from the input/output optical system 2, 6 a collimator lens for transmission lights, 7a and 7b collimator lenses for monitoring lights, 8 a switch unit as a deflection means (e.g., MEMS), and 9 an optical power detecting unit for detecting power signal lights having undergone the demultiplexing process in the demultiplexing unit 5. The switch unit 8 has switch elements 81 to 84 and each of the switch elements 81 to 84 has a piece of MEMS mirror. FIG. 1 illustrates a case where the switch unit 8 has four MEMS mirrors 81 to 84. If wavelength division multiplexed signals sent from the first input/output unit 31a and the second input/output unit 31b are incident on the demultiplexing unit 5 and signal lights having undergone the demultiplexing processing in the demultiplexing unit 5 have wavelengths of λ1 to λ4, the signal lights will be incident on the MEMS mirrors 81 to 84. While in the present embodiment illustration is made on the case where the four MEMS mirrors 81 to 84 are arrayed in one line, the number of MEMS mirrors 81 to 84 may be set to any other plural number than four and the way of arraying the MEMS mirror 81 to 84 may be not limited to in one line but they may be arrayed in a plural number of lines. For example, when the wavelength division multiplexed signal light is led from the first input/output unit 31a and the second input/output unit 31b to the demultiplexing unit 5 and single wavelength lights are obtained by the demultiplexing in the demultiplexing unit 5, the wavelength lights coming from the first input/output unit 31a may be irradiated on the MEMS mirrors 81 to 84 in the first line and the wavelength lights coming from the second input/output unit 31b may be irradiated on the MEMS mirrors 81 to 84 in the second line. In this way, each of the single wavelength lights coming from the first input/output unit 31a and the second input/output unit 31b can be switched independently.

The optical power detecting unit 9 has a group of optical power detecting elements composed of photodiodes 91a to 94a and 91b to 94b, for example. Reference numeral 10 represents a control circuit for carrying out operations such as controlling the switch unit 8, 101 to 104 driving circuit for applying a driving voltage to each of the MEMS mirrors 81 to 84. If electrostatic energy is applied to the MEMS mirrors 81 to 84 to rotate them around a couple of axes, a voltage (positive or negative one) corresponding to the desired angle is applied to any of four voltage pads disposed beneath the MEMS mirrors 81 to 84.

Reference numerals 11*a* and 11*b* represent circulators and 12*a* and 12*b* optical couplers for demultiplexing optical signals, respectively.

Operation of the above-described wavelength selection switch will be hereinafter described.

Figure 11:
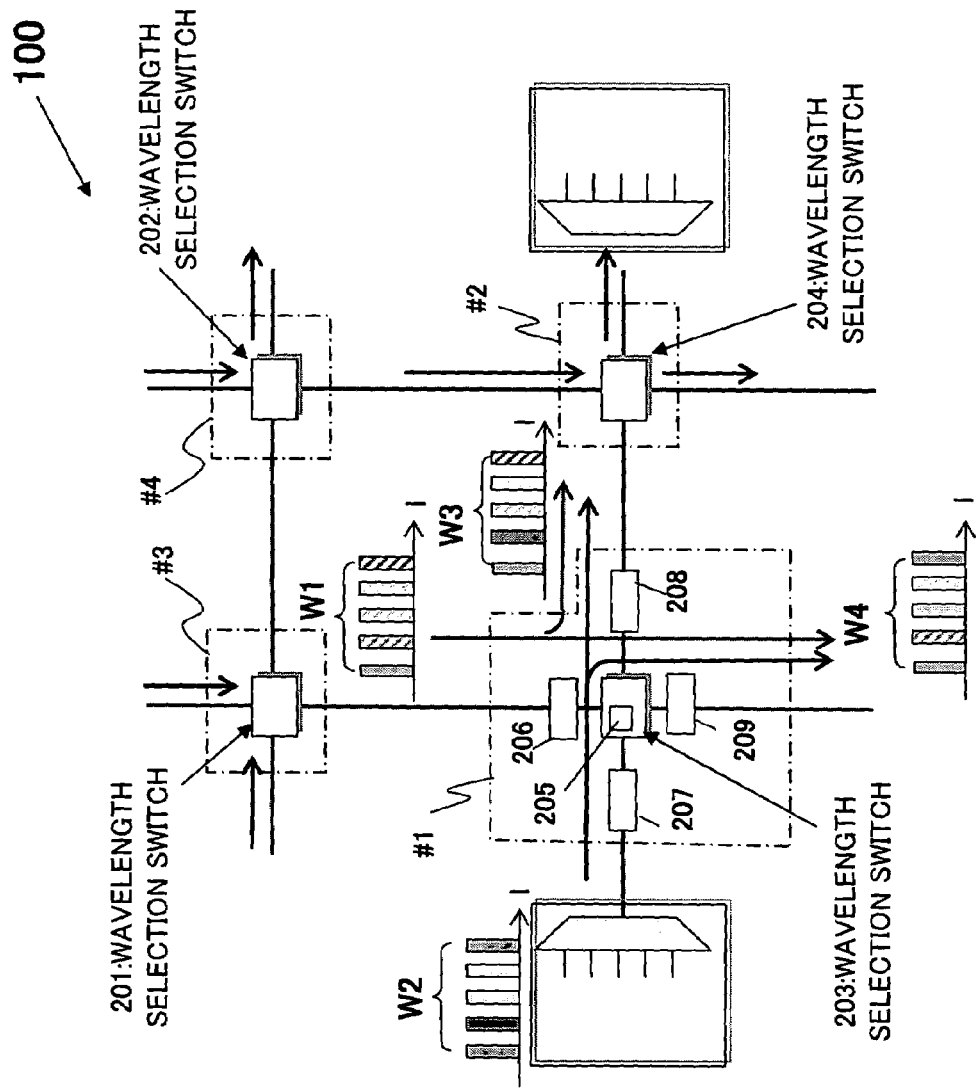
FIG. 11 is a diagram for explaining a wavelength selection switch provided in a mesh-type network.
Figure 12:
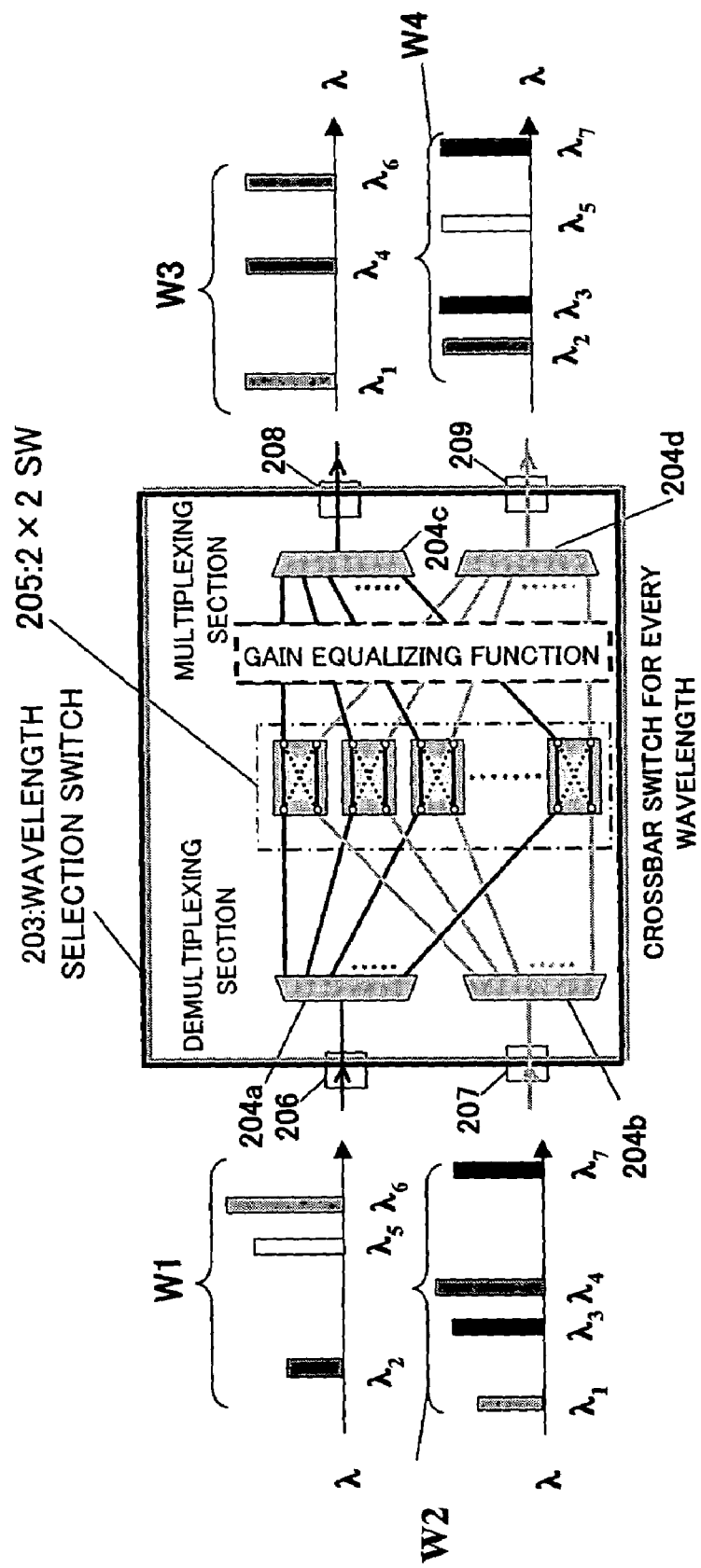
FIG. 12 is a diagram for explaining a wavelength selection switch having 2×2 switch elements provided therein.

As has been set forth above (see FIG. 11), the wavelength division multiplexed signal lights (W1, W2) are inputted into the input ports 206 and 207 owing to the optical fiber connection. The inputted wavelength division multiplexed signal lights are further inputted into the transmission input/output unit 3 at the first input/output unit 31*a* and the second input/output unit 31*b* through the circulators 11*a* and 11*b*. The inputted wavelength division multiplexed signal lights are converted into collimated lights by collimators provided in the input/output optical system 2 and inputted into other components.

(3) Internal Arrangement of the Input/Output Optical System 2

Now the inner arrangement of the input/output optical system 2 will be briefly described.

Figure 3C:
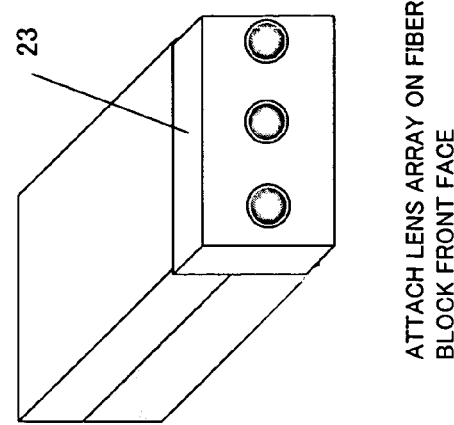
FIGS. 3(a) to 3(c) are diagrams for explaining how one-dimensional collimator array is fabricated based on the first embodiment of the present invention.
Figure 3B:
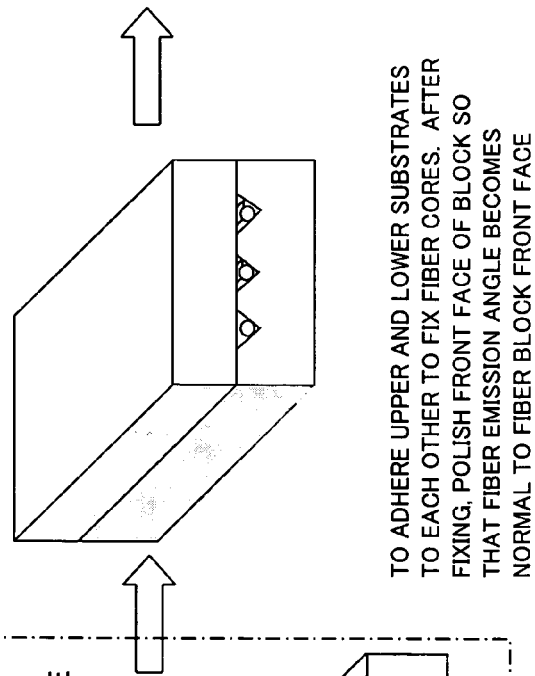
Figure 3A:
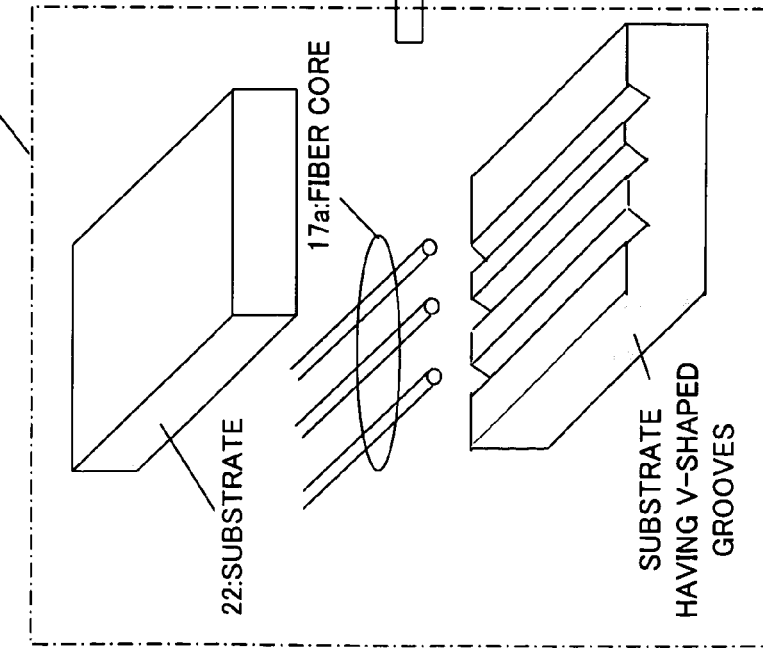

FIG. 2 is a diagram showing an internal arrangement of the input/output optical system 2 according to the first embodiment of the present invention. An optical fiber 15*a* connected to the circulator 11*a* or 11*b* is inserted into a metal cylinder 15*c*. The optical fiber (or ferrule) 15*a* is coated with adhesive on the side face thereof. Thus, the optical fiber (or ferrule) 15*a* is fixed to the metal cylinder 15*c*. The metal cylinder 15*c* has a lens 15*b* provided on the side of the demultiplexing unit 5, i.e., the input/output end side thereof. The input/output lights are collimated by the lens 15*b*. A more desired arrangement therefor is shown in FIGS. 3(*a*) to 3(*c*). As shown in FIGS. 3(*a*) to 3(*c*), a substrate 22 is prepared and a plurality of V-shaped grooves (in this case, three grooves) are provided in parallel in the substrate 22. The left two grooves are assigned to those for monitoring lights and the right one groove is assigned to one for transmission light. Optical fiber core cables 17*a* led from the circulators 11*a* and 11*b* and the optical couplers 12*a* and 12*b* are put on the V-shaped grooves and a substrate 21 is covered on the upper side of the substrate 22 to form a substrate assembly for sandwiching the optical fiber core cables 17*a*. A lens array block 23 (FIG. 3(*c*)) is made to have lens housing recesses at positions corresponding to the positions of the V-shaped grooves, and lenses serving as collimators are housed in respective lens housing recesses of the lens array block 23. Then, this lens array block 23 is attached to the end side of the substrate assembly sandwiching the optical fiber core cable 17*a*. In this way, this input/output unit can serve as a member for the transmission light and a member for the monitoring light. In this case, it is desirable for the demultiplexing unit 5 to be used for the transmission light and the monitoring light. However, members for the transmission light and the monitoring light may be individually prepared.

The input/output optical system 2 constructed by the steps illustrated in FIGS. 3(*a*) to 3(*c*) has the optical fibers 15*a* arrayed in the Z-axis direction. Therefore, the WDM signals (W1, W2) formed into collimated lights will be irradiated onto the diffraction grating serving as the demultiplexing unit 5 at different spots (spots shifted from each other in the Z-axis direction). Thus, demultiplexed reflected lights can be obtained. Meanwhile, the transmission light input/output unit 3 and the monitoring light input/output unit 4 are shifted from each other only in the Z-axis direction. Therefore, the lights outputted from the input/output optical system 2 to the demultiplexing unit 5 travel substantially the same distance regardless of the kind of the lights, i.e., the transmission light or the monitoring light. The demultiplexing unit 5 may be curved in its surface shape for obviating the collimator lenses.

As shown in FIG. 1, demultiplexed lights having respective wavelengths ($\lambda$1 to $\lambda$4) are collimated onto the respective MEMS mirrors (81 to 84) constituting the switch unit 8 by the collimator lens 6. In this case, in order to illustrate the arrangement in a simple manner, the number of MEMS mirrors provided is four and no single wavelength optical signal is commonly contained in both of the wavelength division multiplexed lights W1 and W2.

The single wavelength lights irradiated onto the MEMS mirrors 81 to 84 are reflected on the corresponding MEMS mirrors and irradiated onto the demultiplexing unit 5 through the collimator lens 6 again.

(4) Concept of Wavelength Selection

In this case, description will be made on an operation that the single wavelength light ($\lambda$1) contained in the wavelength division multiplexed signal light (W1) inputted at the input port 206 is outputted at the output port 209, with reference to FIG. 4(*a*). Components shown in FIGS. 4(*a*) and 4(*b*) corresponding to those described above will be attached with the same reference numerals for denoting the same components.

As shown in FIG. 4(*a*), the wavelength division multiplexed signal light (W1) inputted at the input port 206 is fed to the first input/output unit 31*a* through the circulator 11*a*, subjected to the demultiplexing operation in the demultiplexing unit 5, and the single wavelength light ($\lambda$1) is extracted. This single wavelength light ($\lambda$1) is irradiated onto the MEMS mirror 81 through the collimator lens 6.

The single wavelength light ($\lambda$1) is reflected on the MEMS mirror 81 which is controlled by the control unit 10 in its tilting angle in accordance with the control voltage outputted from e.g. the driving circuit 101 (see FIG. 1), and irradiated onto the demultiplexing unit 5 through the collimator lens 6. The spot of this light irradiation at this time is formed on a position which can lead the light to the second input/output unit 31*b* owing to the reflection on the demultiplexing unit 5. Therefore, it follows that the MEMS mirror 81 is controlled in its angle so that the light is returned to the optical fiber connected to the second input/output unit 31*b*.

Next, description will be made on an operation that the single wavelength light ($\lambda$1) contained in the wavelength division multiplexed signal light (W1) inputted at the input port 206 is outputted at the output port 208, with reference to FIG. 4(*b*).

As shown in FIG. 4(*b*), the wavelength division multiplexed signal light (W1) inputted at the input port 206 is fed to the first input/output unit 31*a* through the circulator 11*a*, subjected to the demultiplexing operation in the demultiplexing unit 5, and the single wavelength light ($\lambda$1) is extracted. This single wavelength light ($\lambda$1) is irradiated onto the MEMS mirror 81 through the collimator lens 6.

The single wavelength light ($\lambda$1) is reflected on the MEMS mirror 81 which is controlled by the control unit 10 in its tilting angle in accordance with the control voltage outputted from the driving circuit 101, and irradiated through the collimator lens 6 onto the demultiplexing unit 5 at substantially the same position as that when the light is initially incident onto the demultiplexing unit 5. Therefore, it follows that the MEMS mirror 81 is controlled in its angle so that the light is returned to the same optical fiber as one connected to the first input/output unit 31a.

As described above, the optical signal light reflected on the MEMS mirror 81 is outputted from the first input/output unit 31a or the second input/output unit 31b depending on the reflection angle and outputted at the output port 208 or 209 through the circulators 11a or 11b. Of course, the wavelength division multiplexed signal light input is also made at the second input/output unit 31b. However, the operation of such case is simply equivalent to one in which the first input/output unit 31a is replaced with the second input/output unit 31b, and the operation will not be described.

While control can be made on the tilting angle of the mirrors by the switch 205 so that a desired transmission path is provided by switching for respective wavelength optical signal lights and these wavelength optical signal can be outputted, the angle control suffers from delicate matters. Therefore, it is requested to establish a way of monitoring whether the mirror is set to have an appropriate angle or not and whether the angle setting is optimized or not.

For this reason, it is requested that respective wavelength signal lights having undergone the wavelength selection are measured in their power, and the MEMS mirror 81 is controlled based on the result of measurement. According to the present embodiment, the wavelength demultiplexing unit 5 and other components utilized for wavelength selection are effectively utilized for responding to the request.

(5) Monitor

An arrangement of the monitor will be hereinafter described in detail.

The optical signals selected by the reflection control by the MEMS mirrors 81 to 84 are again subjected to wavelength division multiplexing through the demultiplexing unit 5. The resultant signals are inputted into the circulators 11a and 11b and demultiplexed by the optical couplers 12a and 12b, respectively. The demultiplexed signals are inputted into the third input/output terminal 41a and the fourth input/output terminal 41b of the monitoring light input/output unit 4, respectively.

As shown in FIG. 1, the input/output optical system 2 is arranged to include not only the transmission light input/output unit 3 but also the monitoring light input/output unit 4. Preferably, the input/output optical system 2 is disposed so as to oppose to the demultiplexing unit 5, which is composed of a sheet of common diffraction grating. Therefore, the wavelength division multiplexed signal transmitted from the monitoring light input/output unit 4 is irradiated onto the common demultiplexing unit 5. However, the irradiation position thereof will be different from that of the wavelength division multiplexed signal transmitted from the transmission light input/output unit 3. In this example, the irradiation positions are shifted from each other in the Z-direction. In this case, a desired arrangement of the demultiplexing unit 5 is a single unit of demultiplexing unit 5, but two pieces of demultiplexing units 5 may be coupled to each other in the arrangement.

As described above, the wavelength division multiplexed signal lights outputted from the monitoring light input/output unit 4 shown in FIG. 1 are once demultiplexed by the demultiplexing unit 5 and then subjected to the collimating process in the collimating lens 7a (when the optical signal is one from the third input/output unit 41a) and the collimating lens 7b (when the optical signal is one from the fourth input/output unit 41b). Thereafter, the lights are inputted into the separate power detecting elements (91a to 94a, 91b to 94b) depending on the demultiplexed wavelength. In this case, the collimator lens 7a and 7b are desirably formed into a collimator lens having a characteristic similar to that of the transmission light collimator lens 6. If the collimator lens 6 is arranged to be a single piece of lens, the collimator lenses 7a and 7b are also arranged to be a single piece of lens. In order to seek further reduction in the number of parts, the collimator lens 6, 7a, 7b may be unitarily formed into a single piece.

The optical power detecting unit 9 is composed of n-pieces of photodiode elements which are arrayed along the X-axis intersecting the Z-axis to form two arrays so that the Z-axes are different from each other. A first array of photodiode elements 91a to 94a performs power detection on wavelength division multiplexed signal lights of respective wavelengths (in this case $\lambda 1$ to $\lambda 4$) which derive from the demultiplexing in the demultiplexing unit 5 and are transmitted from the third input/output unit 41a. A second array of photodiode elements 91b to 94b performs power detection on wavelength division multiplexed signal lights of respective wavelengths (in this case $\lambda 1$ to $\lambda 4$) which derive from the demultiplexing in the demultiplexing unit 5 and are transmitted from the second input/output unit 42a. In the power detection operation, an electric current corresponding to the averaged intensity of the inputted light is outputted to apply to the control unit 10. A preferable arrangement for the respective photodiodes and the substrate is such that the respective photodiodes are integrally formed on the same substrate so as to create the similar layout interval (X-axis direction) to the respective MEMS mirrors 8, and the substrate is disposed so that the monitoring lights demultiplexed into the respective wavelength division demultiplexed signal lights are incident on the substrate in a manner similar to that of the MEMS mirror.

Figure 14A:
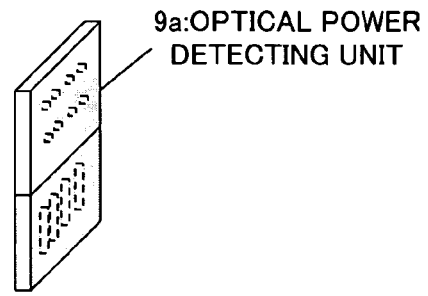
FIG. 14(a) is a diagram showing a device having a photodiode elements and the MEMS mirror elements integrally provided thereon according to another modification of the present invention.
Figure 14B:
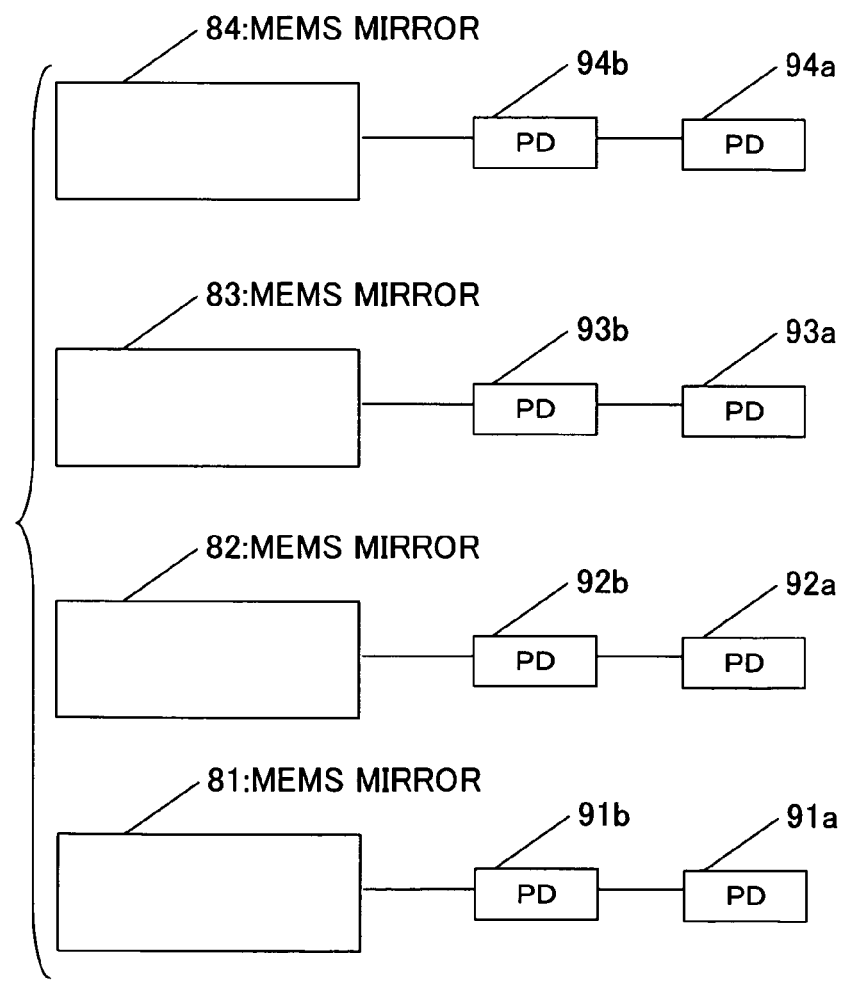
FIG. 14(b) is a diagram schematically showing one example of arrangement of an optical power detecting unit according to another modification of the present invention.

FIG. 14(*a*) is a diagram showing an outward appearance of the photodiodes and the MEMS mirrors 8 which are unitarily provided together on the substrate according to the first embodiment of the present invention. As shown in FIG. 14(*a*), the power detecting unit 9a is formed on the silicone substrate so that the above two functions are implemented on the same substrate. FIG. 14(*b*) schematically shows the arrangement of the mirrors and the photodiodes. As shown in FIG. 14(*b*), the layout of the MEMS mirrors 81 to 84 are made coincident with that of the photodiodes 91a to 94a and the photodiodes 91b to 94b, and the MEMS mirrors 81 to 84 and the photodiodes 91a to 94a, 91b to 94b are fabricated on the same silicon substrate. In this way, the MEMS mirror 84 and the optical power detecting unit 9a are disposed on the substrate so as to be shifted from each other in only the Z-axis direction. If the MEMS mirror 84 and the optical power detecting unit 9a are not formed on the same substrate, for example, substrates having the respective components formed thereon are placed in positions such that the relative positional relationship between the substrates is kept similar to that of the common substrate arrangement in which both of the components are formed thereon. Further, it is desired that the distance to the demultiplexing unit 5 is made equal to that of the corresponding MEMS.

As described above, the optical signals of the respective wavelengths ($\lambda 1$ to $\lambda 4$) are inputted into the optical power detecting elements of the optical power detecting unit 9a and information concerning the detected power of the optical signals is supplied to the control circuit 10. The control circuit 10 controls the corresponding driving circuits 101 to 104 depending on the information. In this way, corresponding one of the MEMS mirrors 81 to 84 is controlled in its angle so as to control the direction of polarization.

Meanwhile, the optimized tilting angle of the MEMS mirror 81 (or 82, 83, 84) is determined not only in a manner to seek an angle leading to the smallest coupling loss but also in a manner to seek VOA (Variable Optical Attenuator) function so that a desired level of attenuation is set to the optical power of the single wavelength light. In this case, the tilting angle of the MEMS mirror 81 to 84 is deviated from the optimized point (at which the coupling loss becomes the smallest) in a certain manner, i.e., the angle is intentionally determined so that the loss of the single wavelength light is increased.

Finally, the arrangement and control of the MEMS mirror 8 will be briefly described. The number of the MEMS mirror 81 to 84 is preferably set to a desired number of wavelengths placed under the wavelength selection.

(6) MEMS Arrangement

Figure 5:
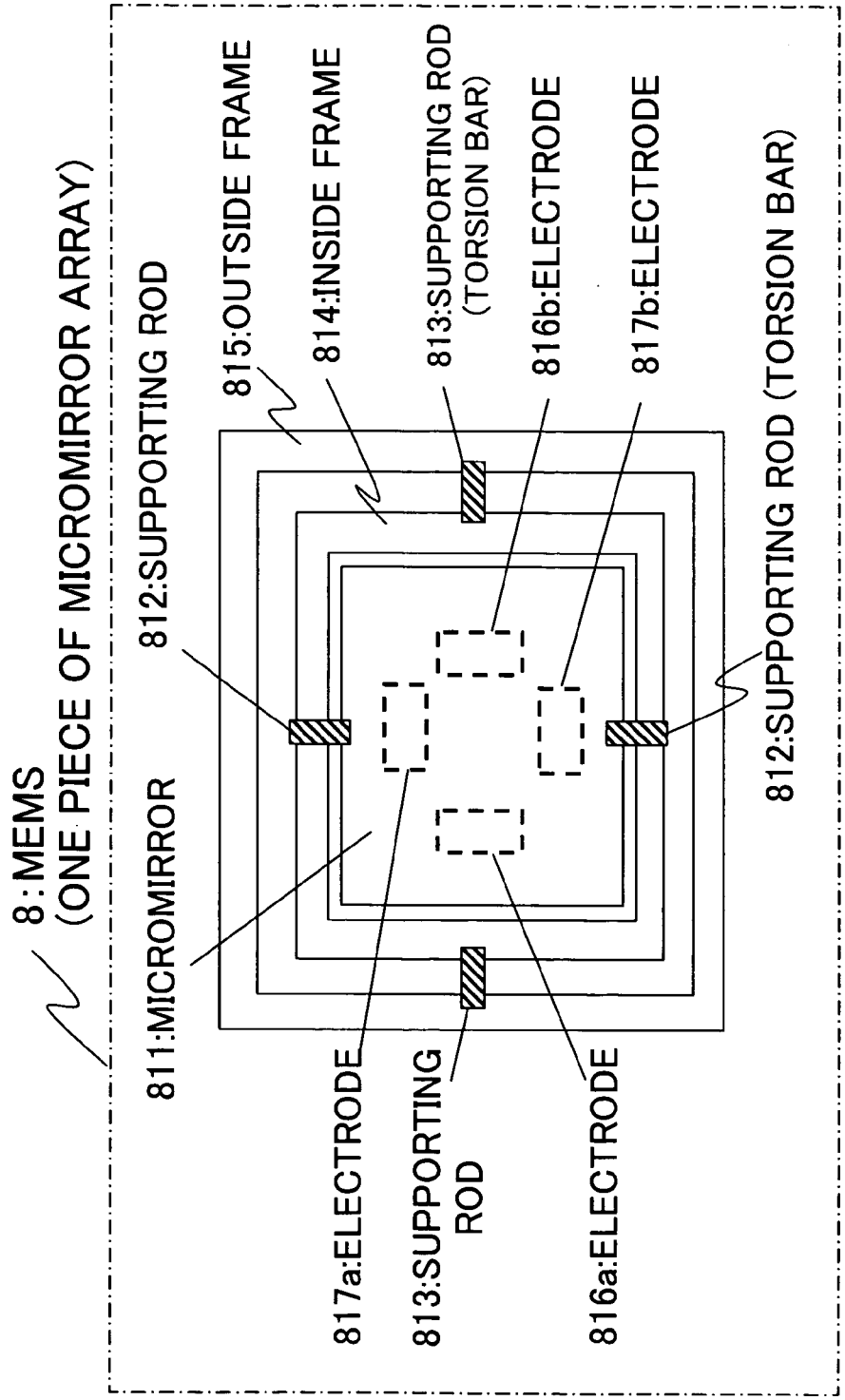
FIG. 5 is a plane view illustrating an arrangement of an MEMS mirror according to the first embodiment of the present invention.

FIG. 5 is a plane view for explaining the arrangement of the MEMS 8 according to the present invention.

In FIG. 5, reference numeral 811 depicts the MEMS mirror (micromirror) for reflecting the optical signals inputted thereto, and this micromirror is made rotatable around a supporting rod 812 as a rotating shaft. The supporting rod 812 is placed under a fixing relationship with the MEMS mirror 811 and made rotatable around a bearing groove formed on an inside frame 814. A supporting rod 813 is placed under a fixing relationship with the inside frame 814 and made rotatable around a bearing groove formed on an outside frame 815.

As shown in FIG. 5, the MEMS mirror 811 has four pieces of electrodes provided beneath the micromirror. A pair of electrodes 816*a* and 816*b* is utilized for rotating the MEMS mirror 811 around the supporting rod 812 as a shaft. If a positive or negative voltage is applied to one of the electrode pair, the MEMS mirror 811 will be tilted by a desired angle owing to an electrostatic force in a direction of the electrode to which the voltage is applied.

Conversely, the other electrode pair, i.e., a pair of electrodes 817*a* and 817*b* is utilized for rotating the MEMS mirror 811 around the supporting rod 813 as a shaft. Also, if a positive or negative voltage is applied to one of the electrode pair, the MEMS mirror 811 will be tilted by a desired angle in a direction of the electrode to which the voltage is applied.

As described above, a general arrangement of the MEMS mirror 811 is one having two shafts around which the mirror can be rotated. If consideration is mainly made on switching between the first input/output unit 31*a* and the second input/output unit 31*b*, as will be understood from FIG. 1, switching can be substantially accomplished by a control for rotating the MEMS mirror 811 around the X-axis of FIG. 1. Thus, in order to make the explanation simple, description will be made on rotation control about rotation around one rotating shaft in relation with the switching action.

Figure 6B:
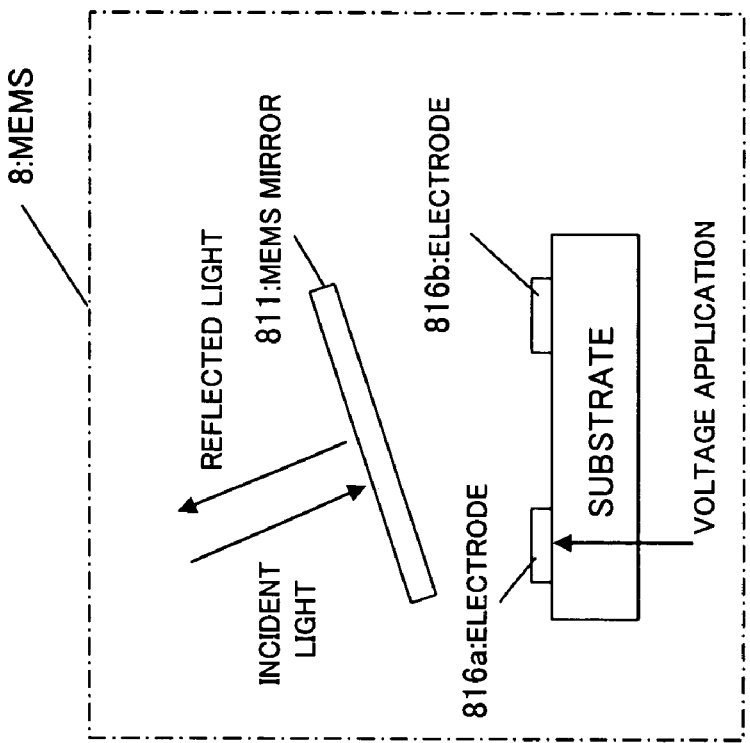
FIGS. 6(a) and 6(b) are diagrams for explaining how switching control is performed in accordance with the rotational angle of the MEMS mirror.
Figure 6A:
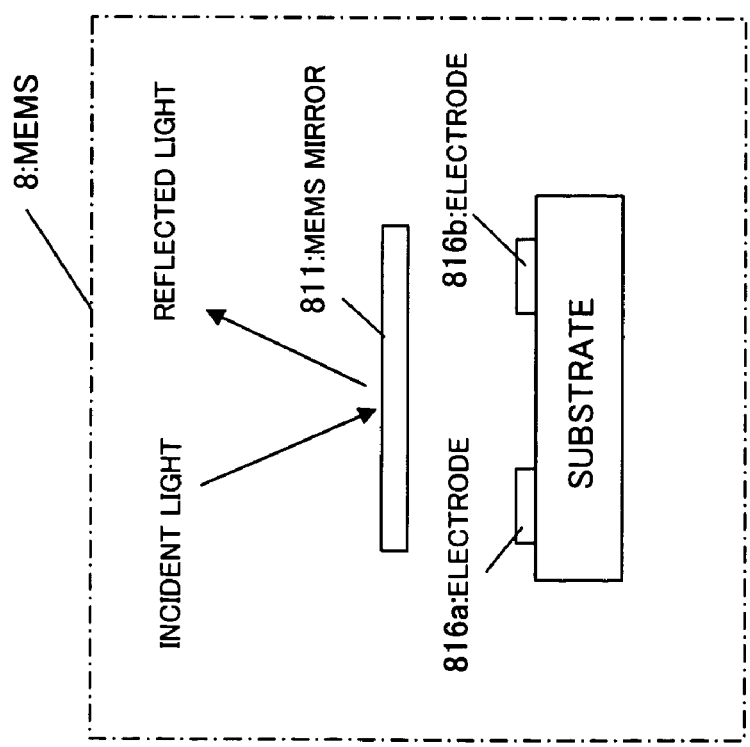

FIGS. 6(*a*) and 6(*b*) are diagrams for explaining switching control based on the rotational angle of the MEMS mirror 811. If a voltage is applied to one of the electrode pairs 816*a* and 816*b* so that the MEMS mirror 811 is controlled to take the tilting angle shown in FIG. 6(*a*), the incident light is polarized and reflected, and transmitted through the demultiplexing unit 5 to the second input/output unit 31*b*. Further, if a voltage is applied to one of the electrode pairs 816*a* and 816*b* so that the MEMS mirror 811 is controlled to take the tilting angle shown in FIG. 6(*b*) (in the case of FIG. 6(*b*), the voltage is particularly applied to the electrode 816*a* side), the incident light will be turn back in the direction of light path which the incident light traveled. Then, the light is transmitted through the demultiplexing unit 5 to the first input/output unit 31*a*.

What set forth above is explanation of the operation of the MEMS mirror 8. The control circuit 10 controls the voltage to be applied to each of the electrodes by controlling the driving circuits 101 to 104.

Now, description will be hereinafter made on various possible modifications of the first embodiment.

(7) Modified Example of Input/Output Optical System

As one modification of the input/output optical system 2, one arrangement employing a two-dimensional collimator array can be proposed.

Figure 7C:
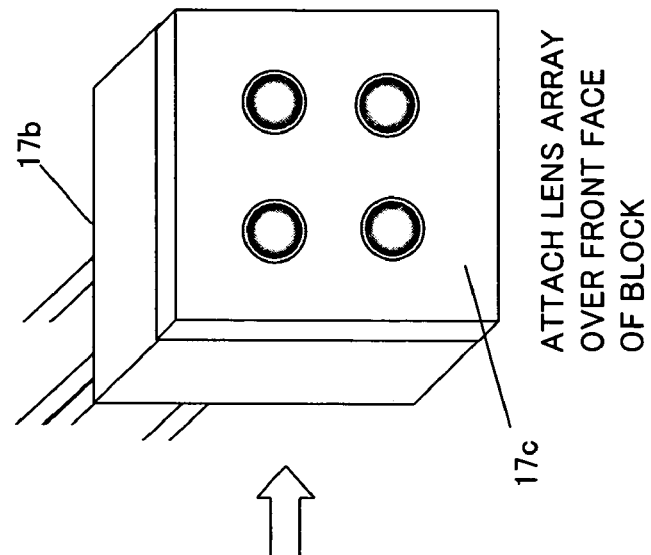
FIGS. 7(a) to 7(c) are diagrams for explaining how two-dimensional collimator array is fabricated as one modification of the present invention.
Figure 7B:
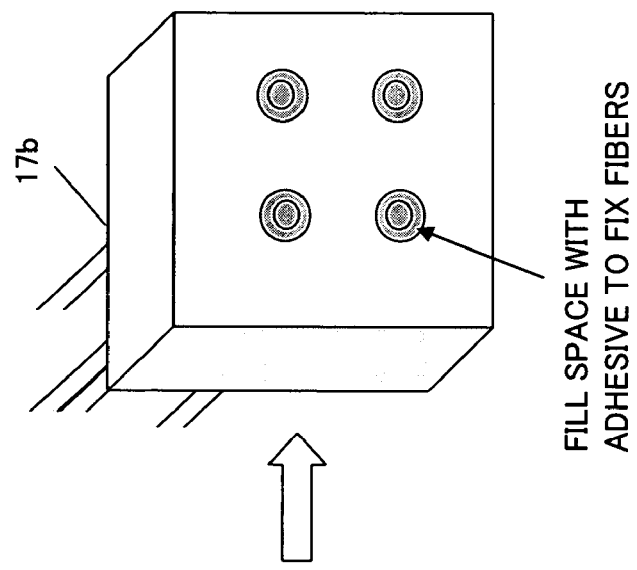
Figure 7A:
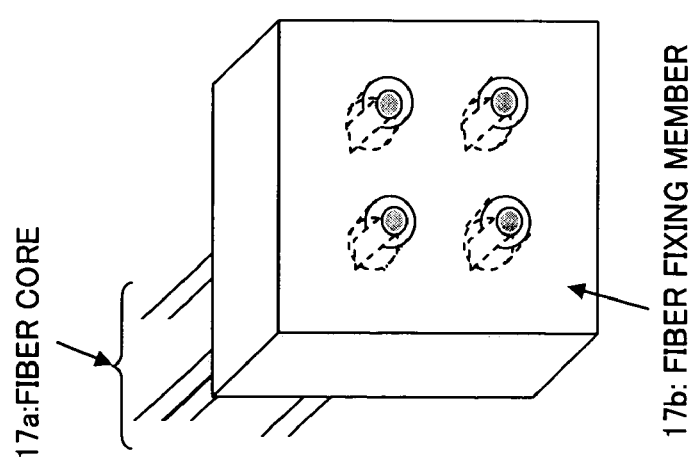

FIGS. 7(*a*) to 7(*c*) are diagrams for explaining steps of fabricating the two-dimensional collimator array according to the embodiment of the present invention. A two-dimensional collimator array 17 shown in FIG. 7(*a*) is made up of an assembly of an optical fiber core 17*a*, an optical fiber fixing member 17*b* and a lens array 17*c*. The optical fiber fixing member 17*b* shown in FIG. 7(*a*) is made of, for example, a metal and has, for example, four holes into which optical fibers are inserted.

Optical fiber cores 17*a* are inserted into the four holes of the optical fiber fixing member 17*b* shown in FIG. 7(*b*), respectively, and spaces (gap portion) are filled with adhesive for fixing the fiber core. End faces of the optical fibers fixed in the optical fiber fixing member 17*b* are polished and the lens array 17*c* shown in FIG. 7(*c*) is attached to the optical fiber fixing member 17*b*. In this way, the two-dimensional collimator array can be fabricated.

Accordingly, the input/output optical system 2 (FIG. 1) is constructed by the unitarily made one-dimensional collimator array or the unitarily made two-dimensional collimator array.

(8) Modified Example of Demultiplexing Unit 5

The demultiplexing unit 5 may be made of VIPA.

FIG. 8(*a*) is a diagram showing an arrangement of a VIPA according to the embodiment of the present invention. The VIPA 12*a* shown in FIG. 8(*a*) is a kind of wavelength dispersion element. This wavelength dispersion element can realize ten to twenty times wider angular dispersion than that of a diffraction grating having an optical layout equivalent to the optical layout (incident angle or the like) of the VIPA. In FIG. 8(*a*), a component attached with reference numeral 31 is a cylindrical lens. This lens allows an incident light to pass through in one direction. Reference numeral 32 depicts a glass plate having a light reflection film 32*a* with a reflectivity of 100% adhesively coated on the upper half portion of the incident-side surface (front face) opposing to the cylindrical lens 31. The lower half portion of the glass plate 32*c* is not covered with the light reflection film 32*a* and is made to have a reflectivity of zero percent (R=0). Therefore, this lower half portion does not reflect any light incident thereon and hence all lights incident thereon will be allowed to pass through the glass plate 32 to reach the back face of the glass plate 32. Further, the glass plate 32 has a light reflection film 32*b* with a high reflectivity (~95%) adhesively coated on the light emission side surface (i.e., the back face) thereof. If a wavelength division multiplexed signal light is incident from the side of the cylindrical lens 31 onto the front face of the glass plate 32 and reaches the back face of the same having the light reflection film 32*b*, this light is divided into two lights, i.e., one penetrating through the back face and one reflected on the back face. The separated lights are outputted from the light emission side surface after passing through the glass plate 32 having the light reflection film. If the VIPA 12*a* is employed as a modified example of the present embodiment, the glass plate 32 of the VIPA 12a is preferably made to have a lateral width sufficiently extended so that the glass plate can receive two channels of monitoring lights and two channels of transmission lights from the four cylindrical lenses 31. In this way, this glass plate can demultiplex the lights collectively.

Figures 8A, 8B:
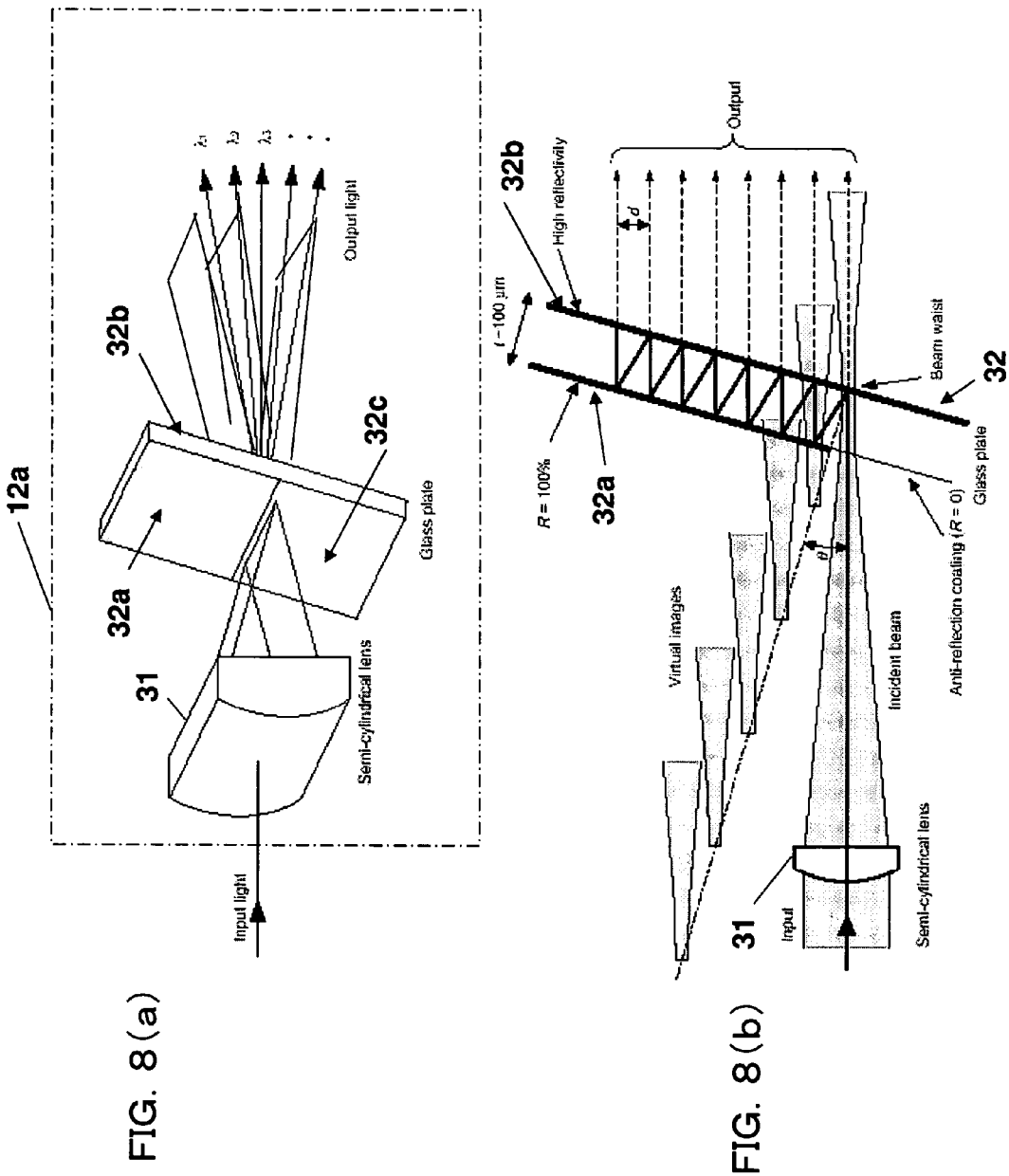
FIG. 8(a) is a diagram showing an arrangement of a VIPA according to another modification of the present invention.
FIG. 8(b) is a diagram for explaining demultiplexing function of the VIPA according to the modification of the present invention.

FIG. 8(b) is a diagram for explaining the demultiplexing function of the VIPA 12a according to the embodiment of the present invention. As shown in FIG. 8(b), the lights traveling toward the glass plate 32 are collimated by the cylindrical lens 31 so as to be focused on the glass plate 32. The positional relationship between the cylindrical lens 31 and the glass plate 32 is determined so that the light reflection film 32b is placed at the beam waist (the point at which the bundle of lights is most converged). The light reflection film 32b reflects certain percentage up to 95% of the incident lights and allows remaining percentage of lights to pass through the glass plate 32. The reflected lights thereof are again reflected on the light reflection film 32a and, owing to the light reflection film 32b, the reflected lights are again divided into a reflected light and a penetrating light.

Figure 9:
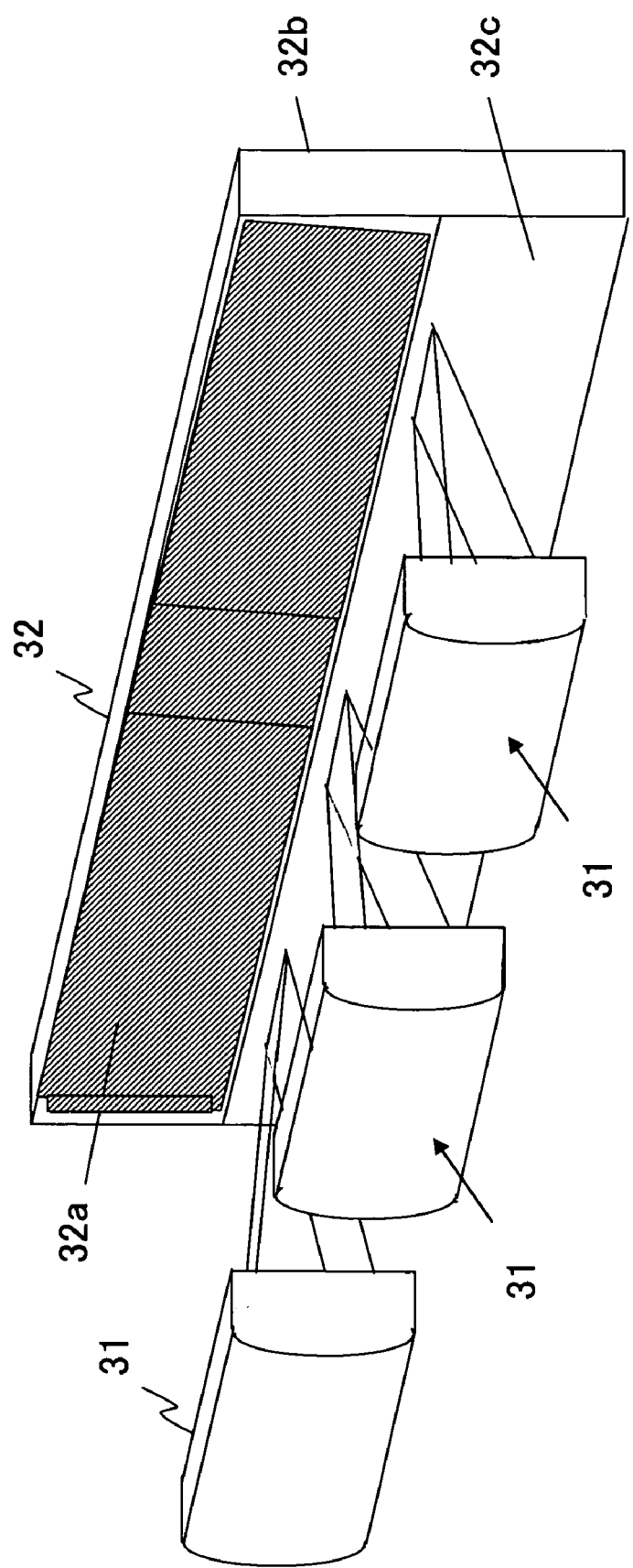
FIG. 9 is a diagram showing one example of the VIPA having a plurality of cylindrical lenses provided according to another modification of the present invention.

FIG. 9 is a diagram showing one example of a VIPA module having a plurality of cylindrical lenses 31 provided according to the embodiment of the present invention. As shown in FIG. 9, the VIPA module 13 has three sets of cylindrical lenses 31 and with this arrangement, the VIPA module 13 can demultiplex three channels of inputted lights. Components shown in FIG. 9 corresponding to those described above are attached with the same reference numerals.

As described above, as a result of multiple reflection, the whole system serves as a system equivalent to a phased array light source, and the lights deriving from the virtual phased array light source interfere with each other, are emitted as collimated lights. The direction of emission becomes equivalent to the Bragg angle of the diffraction grating. As described above, with the VIPA, it becomes possible to demultiplex lights by an extremely simple structure.

The signal light demultiplexing is performed in the longitudinal direction. The MEMS 8 (FIG. 1) is desirably disposed in accordance with the respective demultiplexed signal lights.

While in the above example the demultiplexing unit is implemented by the VIPA 12a, this demultiplexing unit may be implemented by a prism. The prism in this case may be composed of a triangular glass prism. Similarly to the diffraction grating, such prism divides a light incident onto the prism at a constant angle and containing 176 wavelength components into 176 light components and assigns different light emission angles to respective light components depending on each wavelength. Meanwhile, the transmission lights and the monitoring lights are desirably incident on different spots on the demultiplexing unit. In this way, the lights separation can be performed without interference with one another.

Also, the demultiplexing unit may be implemented by one fabricated by photonic crystallization technology. The photonic crystal is composed of a multi-dimensional periodic lattice structure made of materials having different refractive indices, and has a high dispersion property. If the demultiplexing unit made of the photonic crystal having the high dispersion property is employed, it becomes possible to realize an excellent optical property which will not be obtained if the prism is composed of a conventional photonic material. In this case, the photonic crystallization technology means a technology for creating an optical demultiplexing unit on a surface of or in an internal structure of a semiconductor device. The photonic crystallization technology also includes a technology for constructing the optical demultiplexing unit in an inner structure of the semiconductor device in a manner of periodic lattice structure. By using the photonic crystallization technology, a designer will obtain greater freedom in selecting materials or designing the structure of a device. Therefore, if a demultiplexing unit having the high dispersion property of the photonic crystal is employed, the wavelength selection switch can be more small-sized.

(9) Other Network Arrangement

Figure 10:
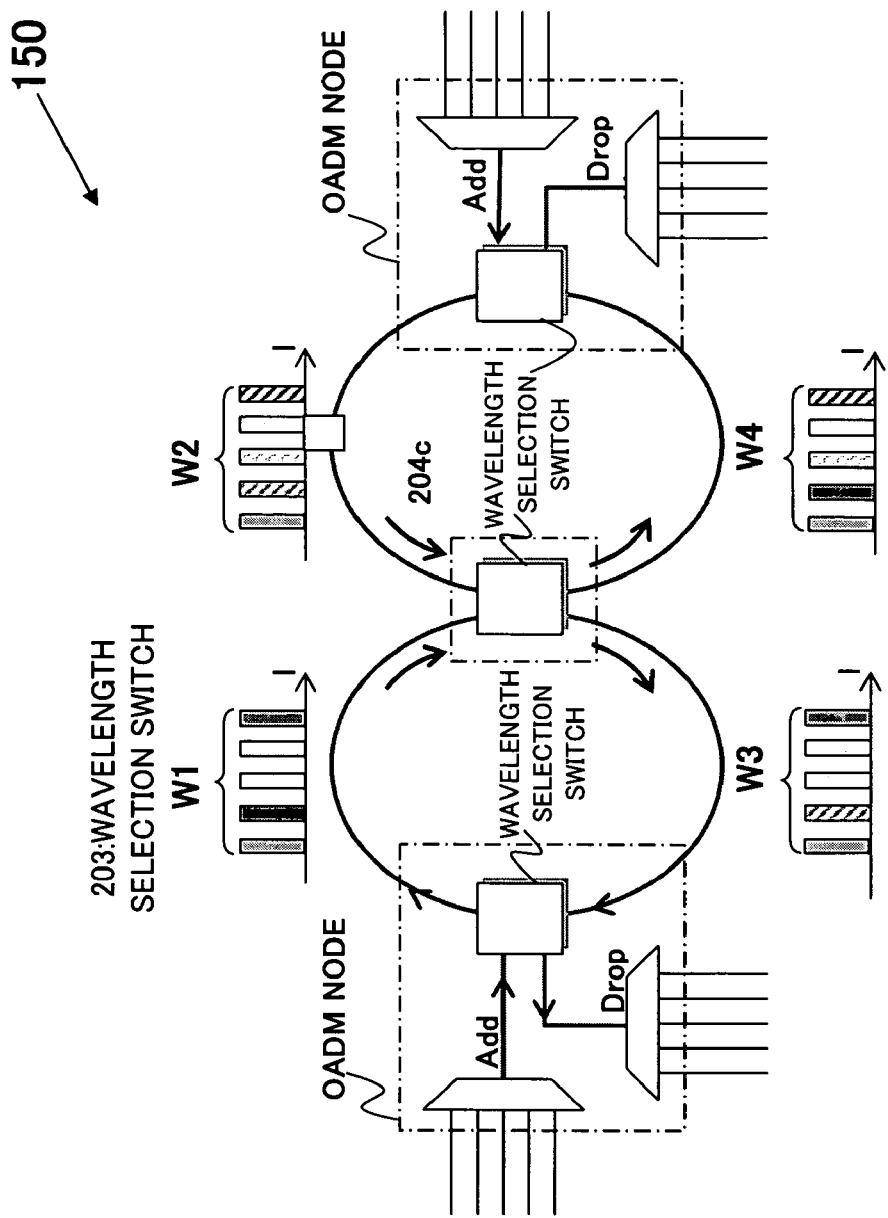
FIG. 10 is a diagram showing one example of an optical network to which the present invention can be applied.

FIG. 10 is a diagram showing other example of an optical network to which the present invention can be applied. An optical network 150 shown in FIG. 10 is a ring-type photonic network having a wavelength selection function for handling wavelength division multiplexed signal lights. This optical network 150 is connected with three OADM nodes #1 to #3, for example. Of the 176 waves, only five wavelength components are illustrated.

In this arrangement, the OADM nodes #1 and #2 belong to a ring R1 and the OADM nodes #2 and #3 belong to ring R2. The OADM node #2 belongs at the same time to both of the rings R1 and R2.

All of the OADM nodes #1 to #3 have add-drop functions.

In more concretely, each of the OADM nodes #1 to #3 determines whether a wavelength division multiplexed signal light received from a transmission path is one for the self node or not. If it is determined that the signal light is not for the self node, the node allows the wavelength division multiplexed signal light to pass through the self station to sent it to the adjacent node. Conversely, if it is determined that the signal light is one for the self node, more than one single wavelength light of the wavelength division multiplexed signal light is dropped and the dropped more than one single wavelength light is converted into a packet. Conversely, when each of the OADM nodes #1 to #3 tries to insert a received single wavelength signal light into the wavelength division multiplexed signal light, the received packet is converted into a signal light having a predetermined wavelength, and the converted signal light is inserted into the received wavelength division multiplexed signal light.

As described above, each of the OADM nodes #1 to #3 receives wavelength division multiplexed signal light from the ring transmission paths R1 and R2 in two or more directions. The number n derives from the number of wavelength division multiplexed signals contained in each of the wavelength division multiplexed signal light. Each of the OADM nodes #1 to #3 performs switching on transmission paths of n- (n represents a natural number) single wavelength signal light independently. The n-single wavelength signal lights having undergone the transmission path switching are subjected to wavelength division multiplexing, and the resultant signals can be outputted in two directions.

In a similar manner, the optical switching apparatus, various kinds of optical monitors and optical switching method of the present invention can be applied to any types of network regardless of the difference in the network topology. As a consequence, the aforesaid advantages of the present invention can be obtained.

(10) Other Disclosure

The present invention is not limited to the above-described embodiment and modifications thereof, but various changes and modifications can be effected without departing from the gist of the present invention.

For example, the above-described demultiplexing unit 12 may be implemented by an arrayed waveguide grating (AWG). This AWG utilizes arrayed waveguide diffraction grating composed of optical waveguides which are formed on a flat substrate having a chip-shape. AWG may be composed of optical waveguides collectively created by using photolithography on a silicon substrate, for example. This AWG is arranged to include an input waveguide, an input slab (input side slab waveguide), an arrayed waveguide composed of n-channels waveguides (channel waveguide array), an output slab (output side slab waveguide), and an output waveguide composed of n-waveguides. A plurality of AWG devices having the similar arrangement may be provided on the same substrate for use for transmission light and monitoring light.

In connection with the foregoing description, the following items (i) to (vi) are disclosed.

(i) A wavelength selection switch (A WDM light demultiplexing unit) includes demultiplexing means for receiving a wavelength division multiplexed light at a first spatial position thereof and demultiplexing the WDM light into a plurality of signal light; deflection control means for independently controlling the signal lights deriving from the demultiplexing means in deflection direction thereof, and effecting multiplexing on the signal lights to form a signal light; irradiating means for receiving the signal light deriving from the multiplexing on the signal lights having undergone the deflection control and irradiating the signal light onto the demultiplexing means at a second spatial position thereof so as to form a plurality of signal lights; and feedback means for monitoring the signal lights deriving from the demultiplexing at the second spatial position of the demultiplexing means for obtaining information useful for desired deflection control, and feeding the information back to the deflection control means.

(ii) The feedback means may comprise a plurality of optical power detecting units disposed at respective positions which make it possible for the optical power detecting units to receive the signal lights deriving from the demultiplexing at the second spatial position of the demultiplexing means, respectively.

(iii) A wavelength selection switch comprises: demultiplexing means for demultiplexing wavelength multiplexed light; deflection control means for independently controlling the signal lights deriving from the demultiplexing means in deflection direction thereof, and effecting multiplexing on the signal lights to form a signal light; monitoring means for receiving the signal light deriving from the multiplexing on the signal lights having undergone the deflection control, irradiating the signal light onto the demultiplexing means to form a plurality of signal lights, and monitoring the plurality of signal lights; and feedback means for feeding the result of monitoring back to the deflection control means.

(iv) A wavelength selection switch comprises: first demultiplexing means for demultiplexing wavelength multiplexed light; second demultiplexing means disposed near the first demultiplexing means; deflection control means for independently controlling the signal lights deriving from the first demultiplexing means in deflection direction thereof, and effecting multiplexing on the signal lights to form a signal light; monitoring means for receiving the signal light deriving from the multiplexing on the signal lights having undergone the deflection control, irradiating the signal light onto the second demultiplexing means to form a plurality of signal lights, and monitoring the plurality of signal lights; and feedback means for feeding the result of monitoring back to the deflection control means.

(v) A wavelength selection switch comprises: an input/output optical system composed of common members for a transmission light and a monitoring light; demultiplexing means for demultiplexing a wavelength division multiplexed light coming from the input/output members and outputting the resulting lights therefrom; deflection control means for independently controlling deflection direction of transmission lights deriving from demultiplexing in the demultiplexing means; monitoring means for monitoring a monitoring light demultiplexed by the demultiplexing means; and feedback means for feeding the result of monitoring back to the deflection control means.

(vi) A wavelength selection switch comprises: an input/output optical system for introducing a transmission light and a monitoring light into the unit; demultiplexing means for demultiplexing a wavelength division multiplexed light coming from the input/output optical system; deflection control means for independently controlling deflection direction of transmission lights deriving from demultiplexing in the demultiplexing means; monitoring means disposed on a member commonly constituting the deflection control means for monitoring a monitoring light demultiplexed by the demultiplexing means; and feedback means for feeding the result of monitoring back to the deflection control means.

What is claimed is:

1. A wavelength division multiplexed (WDM) light demultiplexing unit comprising:
    demultiplexing means for demultiplexing a first WDM light irradiated at a first spatial position into a plurality of signal lights;
    reflection control means for independently controlling each reflection direction of said plurality of signal lights demultiplexed in said demultiplexing means;
    irradiating means for irradiating a second WDM light, which is obtained by multiplexing of a plurality of reflection-controlled signal lights, onto a second spatial position of said demultiplexing means; and
    means for sending information concerning the reflection direction obtained by monitoring a plurality of other signal lights, which is irradiated at another position and demultiplexed, back to a control of said reflection control means.

2. A WDM light demultiplexing unit according to claim 1, wherein said demultiplexing means is essentially composed of a piece of diffraction grating or a piece of VIPA (Virtually Imaged Phase Array).

3. A WDM light demultiplexing unit according to claim 1, wherein the reflection control in said reflection control means is carried out by MEMS (Micro Electro Mechanical System) mirror tilting control.

4. A WDM light demultiplexing unit according to claim 1, wherein
    (a) said second spatial position is a predetermined position, and
    (b) said means for sending information comprises a plurality of optical power detecting units for detecting an optical power,
        (b1) said optical power detecting units being disposed at predetermined positions at which said optical power detecting units becomes capable of receiving the signal lights, respectively,
        (b2) the signal lights are to be demultiplexed by an irradiation of the signal light, when the signal light is multiplexed at the predetermined spatial position.

5. A WOM light demultiplexing unit comprising:
first demultiplexing means for demultiplexing a first WDM light;
reflection control means for independently controlling each reflection direction of a plurality of signal lights demultiplexed in said first demultiplexing means;
monitoring means for
(c) giving a second WDM light, which is obtained by multiplexing of a plurality of reflection-controlled signal lights, onto (c1) said first demultiplexing means or (c2) a second demultiplexing means, placed at a vicinity of said first demultiplexing means, for demultiplexing a second WDM light spatial position of said demultiplexing means into a plurality of demultiplexed second WDM lights, and
(d) monitoring the plurality of demultiplexed second WDM lights; and
means for sending a monitoring result of said monitoring means back to a control of said reflection control means.

6. AWDM light demultiplexing unit comprising:
an input/output optical system comprising common members for a transmission light and a monitoring light;
demultiplexing means for demultiplexing a WDM light coming from said input/output system and outputting a plurality of signal lights;
reflection control means for independently controlling each reflection direction of said plurality of signal lights demultiplexed in said demultiplexing means;
monitoring means for monitoring the plurality of signal lights demultiplexed in said demultiplexing means; and
means for sending a monitoring result of said monitoring means back to a control of said reflection control means.

7. AWDM light demultiplexing unit comprising:
an input/output optical system for introducing a transmission light and a monitoring light into said unit;
demultiplexing means for demultiplexing a WDM light coming from said input/output system and outputting a plurality of signal lights;
reflection control means for independently controlling each reflection direction of said plurality of signal lights demultiplexed in said demultiplexing means;
monitoring means, disposed on a member commonly constituting said reflection control means, for monitoring the plurality of signal lights demultiplexed in said demultiplexing means; and
means for sending a monitoring result of said monitoring means back to a control of said reflection control means.

8. A wavelength division multiplexed (WDM) light demultiplexing unit comprising:
a demultiplexer demultiplexing a first WDM light irradiated at a first spatial position into a plurality of signal lights;
a reflection controller independently controlling each reflection direction of said plurality of signal lights demultiplexed in said demultiplexer;
an irradiator irradiating a second WDM light, which is obtained by multiplexing of a plurality of reflection-controlled signal lights, onto a second spatial position of said demultiplexer; and
a sending unit sending information concerning the reflection direction obtained by monitoring a plurality of other signal lights, which is irradiated at another position and demultiplexed, back to a control of said reflection controller.

9. A WDM light demultiplexing unit comprising:
a first demultiplexer demultiplexing a first WDM light;
a reflection controller independently controlling each reflection direction of a plurality of signal lights demultiplexed in said first demultiplexer;
a monitor:
(c) giving a second WDM light, which is obtained by multiplexing of a plurality of reflection-controlled signal lights, onto (c1) said first demultiplexer or (c2) a second demultiplexer, placed at a vicinity of said first demultiplexer, for demultiplexing a second WDM light spatial position of said demultiplexing means into a plurality of demultiplexed second WDM lights, and
(d) monitoring the plurality of demultiplexed second WDM lights; and
a detector sending a monitoring result of said monitor back to a control of said reflection controller.

10. A WDM light demultiplexing unit comprising:
an input/output optical system comprising common members for a transmission light and a monitoring light;
a demultiplexer demultiplexing a WDM light coming from said input/output system and outputting a plurality of signal lights;
a reflection controller independently controlling each reflection direction of said plurality of signal lights demultiplexed in said demultiplexer;
a monitoring monitoring the plurality of signal lights demultiplexed in said demultiplexer; and
a detector sending a monitoring result of said monitor back to a control of said reflection controller.

11. AWDM light demultiplexing unit comprising:
an input/output optical system introducing a transmission light and a monitoring light into said unit;
a demultiplexer demultiplexing a WDM light coming from said input/output system and outputting a plurality of signal lights;
a reflection controller independently controlling each reflection direction of said plurality of signal lights demultiplexed in said demultiplexer;
a monitor, disposed on a member commonly constituting said reflection controller, monitoring the plurality of signal lights demultiplexed in said demultiplexer; and
a detector sending a monitoring result of said monitor back to a control of said reflection controller.

* * * * *

UNITED STATES PATENT AND TRADEMARK OFFICE
CERTIFICATE OF CORRECTION

PATENT NO. : 7,305,188 B2  Page 1 of 1
APPLICATION NO. : 10/893435
DATED : December 4, 2007
INVENTOR(S) : Shinji Yamashita et al.

It is certified that error appears in the above-identified patent and that said Letters Patent is hereby corrected as shown below:

Col. 19, line 1, delete "WOM" and insert --WDM--, therefor.

Col. 19, line 21, delete "AWDM" and insert --A WDM--, therefor.

Col. 19, line 35, delete "AWDM" and insert --A WDM--, therefor.

Col. 20, line 37, delete "monitoring" (first occurrence) and insert --monitor--.

Col. 20, line 41, delete "AWDM" and insert --A WDM--, therefor.

Signed and Sealed this

Thirteenth Day of May, 2008

JON W. DUDAS
*Director of the United States Patent and Trademark Office*